United States Patent
Wang et al.

(10) Patent No.: US 10,055,898 B1
(45) Date of Patent: Aug. 21, 2018

(54) MULTI-VIDEO REGISTRATION FOR VIDEO SYNTHESIS

(71) Applicant: Adobe Systems Incorporated, San Jose, CA (US)

(72) Inventors: Jue Wang, Woodinville, WA (US); Zhaopeng Cui, Port Coquitlam (CA); Oliver Wang, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/439,767

(22) Filed: Feb. 22, 2017

(51) Int. Cl.
*G06T 15/30* (2011.01)
*G06T 19/20* (2011.01)
*G06T 7/37* (2017.01)
*G06T 7/262* (2017.01)
*G06T 17/20* (2006.01)

(52) U.S. Cl.
CPC .............. *G06T 19/20* (2013.01); *G06T 7/262* (2017.01); *G06T 7/37* (2017.01); *G06T 17/205* (2013.01); *G06T 2207/10016* (2013.01); *G06T 2207/20048* (2013.01); *G06T 2207/30244* (2013.01); *G06T 2215/16* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| | | | | |
|---|---|---|---|---|
| 2012/0294530 | A1* | 11/2012 | Bhaskaranand | ...... G06T 7/2053 382/173 |
| 2013/0215221 | A1* | 8/2013 | Wang | ........................ G06T 7/73 348/43 |

OTHER PUBLICATIONS

Lin et al. "Seamless Video Stitching from Hand-held Camera Inputs", Eurographics 2016 vol. 35, No. 3, 2016.*
Su et al. "Video Stitching for Handheld Inputs via Combined Video Stabilization", SA'16 Technical Briefs, Dec. 5-8, 2016.*
Agarwal,"Building rome in a day", Sep. 1, 2009, 8 pages.
Brown,"Recognising Panoramas", ICCV '03 Proceedings of the Ninth IEEE International Conference on Computer Vision—vol. 2, 2003, 8 pages.

(Continued)

*Primary Examiner* — Yingchun He
(74) *Attorney, Agent, or Firm* — Wolfe-SBMC

(57) ABSTRACT

Multi-video registration for video synthesis is described. In example implementations, at least one computing device synthesizes multiple videos to create merged images using an automated mechanism to register the multiple videos. The computing device obtains multiple videos with each video including a sequence of multiple frames. Using multiple camera poses determined in a three-dimensional scene reconstruction, respective frames of respective ones of the multiple videos are linked to produce linked frames. The computing device aligns the linked frames to produce aligned frames using point guidance that is based on the multiple spatial points identified in the 3D scene reconstruction. For example, pixels in each of the linked frames that correspond to a same spatial point of the three-dimensional scene reconstruction can be used to align the linked frames at a pixel level. Based on the aligned frames, the computing device creates at least one merged image to synthesize the multiple videos.

20 Claims, 14 Drawing Sheets

(56) References Cited

OTHER PUBLICATIONS

Brown,"Multi-Image Matching using Multi-Scale Oriented Patches", 2005 IEEE Computer Society Conf. on Computer Vision and Pattern Recognition, Jun. 2005, 8 pages.
Cui,"Global Structure-from-Motion by Similarity Averaging", 2015 IEEE International Conference on Computer Vision (ICCV), Dec. 2015, pp. 864-872.
Ji,"Synthesizing Illumination Mosaics from Internet Photo-Collections", Dec. 2015, pp. 3988-3996.
Jia,"Image Registration with Global and Local Luminance Alignment", 2003 Proceedings. Ninth IEEE International Conference on Computer Vision, Oct. 2003, 8 pages.
Jiang,"A Global Linear Method for Camera Pose Registration", IEEE International Conference on Computer Vision, Dec. 1, 2013, pp. 481-488.
Kahl,"Multiple View Geometry and the L -norm", IEEE Transactions on Pattern Analysis and Machine Intelligence, May 2007, 8 pages.
Liu,"Bundled Camera Paths for Video Stabilization", Journal ACM Transactions on Graphics (TOG)—SIGGRAPH 2013 Conference Proceedings TOG Homepage vol. 32 Issue 4, Jul. 2013, 10 pages.
Liu,"SIFT Flow: Dense Correspondence across Scenes and its Applications", IEEE Transactions on Pattern Analysis and Machine Intelligence ( vol. 33, Issue: 5 ), May 2011, 17 pages.
Lucas,"An Iterative Image Registration Technique with an Application to Stereo Vision", Proceedings of 7th International Joint Conference on Artificial Intelligence (LICAI), Aug. 24-28, 1981, Vancouver, British Columbia, Aug. 24, 1981, pp. 674-679.
Martinec,"Robust Rotation and Translation Estimation in Multiview Reconstruction", IEEE Computer Society Conference on Computer Vision and Pattern Recognition, Jun. 2007, 8 pages.
McLauchlan,"Image Mosaicing using Sequential Bundle Adjustment", Image and Vision Computing vol. 20, Issues 9-10, 1, Aug. 2002, 10 pages.
Snavely,"Photo Tourism: Exploring Photo Collections in 3D", International Conference on Computer Graphics and Interactive Techniques, Available at <http://phototour.cs.washington.edu/Photo_Tourism.pdf>, Jul. 2006, 12 pages.
Wu,"Towards Linear-time Incremental Structure from Motion", Proceedings of the 2013 International Conference on 3D Vision, May 29, 2013, 8 pages.
Zhang,"A Shape-Preserving Approach to Image Resizing", In Proc. Pacific Graphics, 2009, Oct. 9, 2016, 10 pages.

\* cited by examiner

MULTI-VIDEO REGISTRATION FOR VIDEO SYNTHESIS

BACKGROUND

Because most individuals now carry a smart phone, people take more photographs and videos than ever before. A photograph is a static image that captures a scene at one particular instant. A video, on the other hand, is a collection of multiple images that dynamically capture a scene over some elapsed time period. Each video includes numerous individual frames that are played in sequence, with each individual frame being analogous to a single photograph. A video therefore includes significantly more visual data than a single photograph.

Over the last decade or so, many different image editing capabilities have been developed to manipulate photographs using automated tools, such as those provided by applications executing on a desktop computer or smart phone. Example photographic manipulations include: image in□painting, completion, or hole□filling; image perspective correction or rectification; image beautification; image segmentation; and so forth. The results of some of these types of manipulations depend on combining visual data from two different photographs. For instance, one photograph that has a blurry portion of some scene can be improved by replacing the blurry portion with an in-focus portion extracted from another photograph of the same scene. A specific example of photographic manipulation is called time slice photography in which multiple photographs of the same place are taken at different times. The photographs from different times are then combined into a single image by taking a slice from each photograph and merging the slices into a new image. More generally, automated image editing tools can determine matching boundaries between portions of two different photographs and can stitch the portions of the two different photographs together in a manner that appears fairly seamless to the human eye.

Thus, conventional image editing tools enable the automated manipulation of two photographs in which the manipulation involves combining different portions of the photographs into one resulting image. Unfortunately, such automated tools are lacking for video manipulation because combining visual data from two different videos is a more difficult task. Videos, with their sequences of numerous frames, have more visual data and offer a more dynamic and complex view on our three-dimensional (3D) world as compared to the static images of photographs. Consequently, the automated tools and techniques used to manipulate photographs cannot be extended to videos in a straightforward manner. As a result, the image manipulations that are currently applied to videos are primarily manual-based. Furthermore, conventional video manipulations are time consuming, expensive, and essentially limited to non-moving cameras.

SUMMARY

Multi-video registration for video synthesis is described. Techniques and systems described herein enable videos to be manipulated using automated functionality provided by, e.g., image editing applications executing on a computing device. This automated functionality is faster and cheaper than conventional manual approaches and can be applied to videos captured by cameras that are in motion. The described techniques register two or more different videos by finding correspondences between frames of different videos such that a portion of one frame can be ported over to a corresponding frame. Generally, a video synthesis module registers two different videos at a frame level and at a pixel level. The frame level registration is performed by linking frames between two videos based on a similar or matching view into a three-dimensional (3D) scene using determined camera poses. The video synthesis module registers two linked frames at the pixel level by finding respective pairs of pixels of the two linked frames that have corresponding respective spatial points in the 3D scene in common. Such pixel pairs can facilitate alignment of the image data of the linked frames by indicating which meshes of a linked source frame match which meshes in a linked target frame. The video synthesis module creates a merged image from the two aligned frames by warping meshes from the source frame to the target frame based on the pixel-level registration.

In some implementations, at least one computing device executes instructions to perform operations in which multiple videos are synthesized to create merged images using an automated mechanism to register the multiple videos. The video registration can be performed by a computing device without manual input. Initially, multiple videos are obtained, with each video including a sequence of multiple frames. The computing device then links frames from different ones of the multiple videos to produce linked frames using multiple camera poses determined in a 3D scene reconstruction. The 3D scene reconstruction includes multiple spatial points, each of which corresponds to a pixel in at least one frame of the multiple frames. The computing device also aligns the linked frames with respect to each other to produce aligned frames based on particular pixels in different ones of the linked frames that correspond to a common spatial point of the multiple spatial points. In this manner, the multiple spatial points identified in a 3D scene reconstruction are used to register the two-dimensional images of video frames. Using the aligned frames, meshes of pixels are warped from a first frame to a second frame. The warping can be performed under a temporal constraint that enhances consistency between consecutive frames. By combining portions from different ones of the aligned frames responsive to the warping of the meshes, the computing device creates at least one merged image.

In other implementations, a video synthesis module includes a video obtainment module, a video frame linking module, a linked frame alignment module, an inter-frame mesh warping module, and a merged image creation module. The video obtainment module obtains multiple videos, with each respective video including a respective sequence of multiple frames. The video frame linking module links respective frames of respective ones of the multiple videos to produce linked frames using a 3D scene reconstruction and associated camera poses generated from the multiple videos. The linked frame alignment module aligns the linked frames with flow vectors computed using point guidance to produce aligned frames. The point guidance is based on spatial points included in the 3D scene reconstruction that project to corresponding pixels in the linked frames. Thus, the point guidance incorporates projected spatial points into the frame alignment operation. The aligned frames can be designated as source frames and target frames, with each source frame respectively aligned with a target frame. The inter-frame mesh warping module warps meshes from a source frame to a target frame based on the computed flow vectors. The merged image creation module creates at least one merged image using the target frame and the meshes as warped from the source frame.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is presented with reference to the accompanying figures. Items represented in the figures may be indicative of one or more items, and thus reference may be made interchangeably to single or plural forms of the items in the description or in the drawings.

FIGS. 11-1 and 11-2 illustrate example results for multi-video registration for video synthesis in an example time slice video application.

DETAILED DESCRIPTION

Overview

Figure 1:
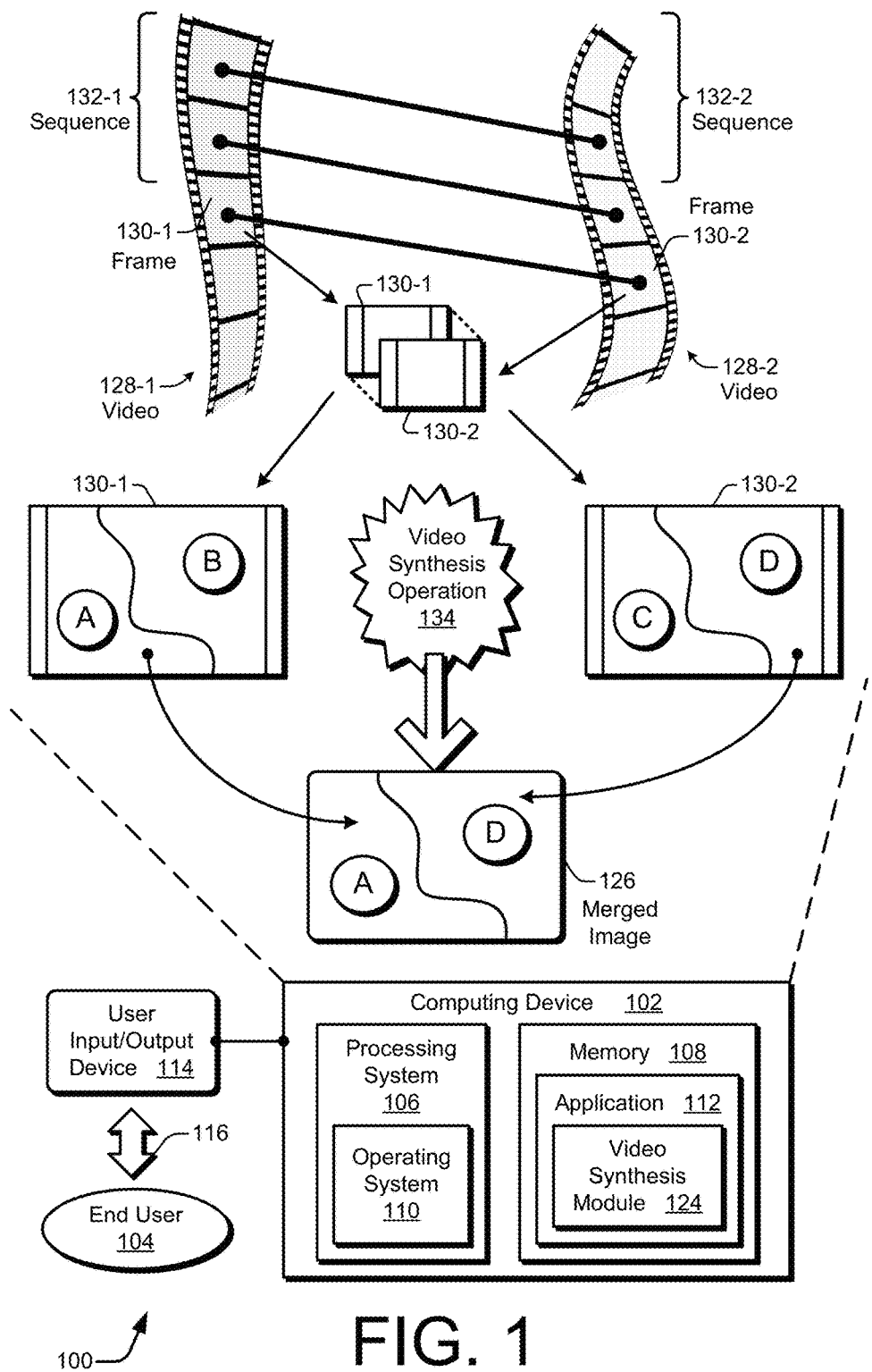
FIG. 1 illustrates an environment having a system for example implementations that are operable to realize multi-video registration for video synthesis with a video synthesis module.

With conventional image editing technologies, photographs can be manipulated using automated tools included in a photo editing program that executes on a computing device, such as a notebook computer or a smart phone. Example types of image manipulations for photographs include: photographic in painting, completion, or hole filling; photographic perspective correction or rectification; photographic beautification; photographic segmentation; time slice photography; and so forth. Some of these example image manipulation types involve using visual data in a portion of one photograph to manipulate the appearance of another photograph. A photograph undergoing such a manipulation provides a static two-dimensional (2D) view of our three-dimensional (3D) world. Consequently, finding a portion of one photograph to use as a basis to manipulate another photograph is a relatively tractable problem.

On the other hand, videos depict a dynamic representation of our 3D world and also provide a 3D view thereof, at least over time. This is especially true with cameras that are in motion as time elapses while the videos are being captured. Furthermore, each video can include numerous sequences of frames, with each individual frame being equivalent to one photograph. This greater amount of visual data recorded over time, in conjunction with the varying view perspectives of our 3D world as a camera moves during filming, jointly increase the difficulty of analyzing multiple videos to enable one video to inform the manipulation of another video. Consequently, conventional mechanisms to manipulate videos by combining portions of different videos focus on basic manipulations, are manual-based and labor-intensive, or limit filming options.

In contrast, methods and systems described herein employ techniques that make automated analysis of the visual data of multiple videos feasible. Moreover, not only can cameras be in motion while videos are being captured, but the camera motion is actually utilized as part of the video synthesis process. Specifically, the camera movement that occurs while videos are being recorded is leveraged to facilitate the matching of portions of different frames. The camera movement enables the registration of videos at both the frame level and the pixel level. The matched video portions can then be used to synthesize the videos into one or more merged images. For instance, a time slice video can be automatically synthesized from multiple videos that are captured by a hand-held camera, such as one that is part of a smart phone.

Thus, techniques and processing systems described herein enable videos to be synthesized to combine visual data from multiple videos into one video. To enable such video synthesis, a 3D approach is implemented to register the videos at a pixel level as well as a frame level. The techniques include generating a 3D scene reconstruction along with determining camera poses for different frames from the multiple videos. The 3D scene reconstruction includes multiple spatial points, with each spatial point corresponding to a pixel in at least one frame of the multiple videos. A processing system links frames from different ones of the multiple videos using the 3D scene reconstruction and the determined camera poses. Based on particular pixels of linked frames that correspond to common spatial points of the 3D scene reconstruction, the processing system aligns linked frames at the pixel level. By using the 3D spatial information, the 2D image information of the linked frames is more accurately aligned. Visually-similar, matching seams between different portions of aligned frames of different videos can therefore be ascertained and utilized in the video synthesis. As a result, a high quality, temporally-stable visual appearance is achieved across different frames, which both increases smoothness and reduces jitter.

In example implementations generally, a video synthesis module analyzes the visual data of two or more videos, including view and perspective changes thereof, to generate a 3D scene reconstruction. The 3D scene reconstruction includes multiple spatial or 3D points that are determined in 3D space and correspond to pixels from different frames. The 3D scene reconstruction in conjunction with a determined camera pose for each frame are used to link frames between two videos such that linked frames have similar camera positions and orientations. The video synthesis module also aligns the linked frames. To do so, the spatial points from the 3D scene reconstruction are projected onto two linked frames. Vector flows between the two linked frames are computed based partially on respective pixels in the two linked frames that correspond to a same projected spatial point. The video synthesis module then warps meshes between two aligned frames using the computed vector flows. The mesh warping determinations can be temporally constrained using a constraint that temporally-proximate frames (e.g., consecutive or temporally-adjacent frames) are to have similar mesh warpings. The video synthesis module then creates respective merged images including portions from both respective aligned frames using the determined mesh warpings.

More specifically, in some implementations, a video synthesis module includes five modules: a video obtainment module, a video frame linking module, a linked frame alignment module, an inter-frame mesh warping module, and a merged image creation module. Each module performs one of five phases to realize a technique for multi-video registration for video synthesis. Although operations of the modules are described sequentially, the operations can alternatively be performed at least partially in a parallel or an overlapping manner.

In a first phase, the video obtainment module obtains multiple videos, with each video having multiple frames. The videos can be obtained directly or indirectly from separate or integrated camera hardware, from local memory, from a remote source such as cloud storage via one or more networks, from a camera application, from an operating system, from some combination thereof, and so forth. Although more than two videos can be incorporated into a video synthesis operation, this example focuses on two videos for simplicity. Second and third phases implement an image registration to transform a set of images into one coordinate system. Although a direct method or a feature-based method can be utilized for image registration, an example method described herein pertains to a direct method, specifically a mesh-based method.

In the second phase, the video frame linking module registers sequences of frames from the two videos at a frame level in 3D space. To perform this frame-level registration, the video frame linking module obtains a 3D scene reconstruction of a filmed scene that is based on the two videos taken with multiple camera poses, with each camera pose including a camera position and orientation. The 3D scene reconstruction includes multiple coordinate spatial points that are dispersed or located across a 3D space that represents the filmed scene. Each spatial point corresponds to a pixel of at least one frame of the two videos. The 3D scene reconstruction can be generated and the multiple camera poses can be determined by the video frame linking module using, for instance, a structure from motion (SfM) algorithm. Alternatively, the video frame linking module can obtain the 3D scene reconstruction along with the determined camera poses from another application or system that uses the two videos to generate the 3D scene reconstruction. Using the 3D scene reconstruction and associated camera poses, the video frame linking module links frames from different videos based on those frames that have similar camera poses and responsive to the elapsed time for the frames along the frame sequences of the two videos.

Of the two videos, one is referred to herein as a source video, and one is referred to as a target video. Further, the frames of a source video are referred to as source frames, and the frames of a target video are referred to as target frames. However, any given video can be designated as the source video or the target video. In this example, the video frame linking module links frames, such as one source frame and one target frame, between the two videos based on multiple camera poses that are determined in the 3D scene reconstruction.

In the third phase, the linked frame alignment module registers frames at a pixel level in 2D image space based on the frame-level registration. The linked frame alignment module projects spatial points of the 3D scene reconstruction onto each frame. Some pre-warping from a source frame to a linked target frame is performed using a global homography transformation that is applied based on the projected points. The linked frame alignment module further matches pixels between the pre-warped source frame and the target frame to compute flow vectors, such as scale invariant feature transform (SIFT) flow vectors. The flow vectors are computed based on a data factor, a smoothness factor, and a point guidance factor. The linked frame alignment module uses the point guidance factor to nudge flow vectors in a direction such that a pixel in the source frame that corresponds to a particular spatial point of the 3D scene reconstruction is more likely to be matched to a pixel in the target frame that corresponds to the same particular spatial point. A bi-directional consistency check can also be performed for each pair of pixels and the associated flow vector to verify that a flow vector is valid. These computed flow vectors serve to align the linked frames at the pixel level.

In the fourth phase, the inter-frame mesh warping module determines where meshes of the source frame are warped onto the target frame based on the computed flow vectors. The inter-frame mesh warping module further warps each mesh based on a data factor, a shape preservation factor, and a temporal similarity factor. The temporal similarity factor enforces a degree of temporal consistency to the mesh warping. Based on the temporal similarity factor, the inter-frame mesh warping module nudges warped meshes so as to reduce the amount of warping deviation for a given mesh between proximate frames, such as between consecutive frames, along a video sequence.

In the fifth phase, the merged image creation module combines at least one portion of the source frame with at least one portion of the linked and aligned target frame to create a merged image based on the mesh warpings. The creation of the merged image can be performed in conjunction with the warping of meshes as determined during the fourth phase. By using the linked frames from the second phase, the modules implementing the third, fourth, and fifth phases can operate on each pair of linked frames in a video sequence. Thus, respective merged images can be created for each respective pair of linked frames to thereby synthesize the two videos. This process can produce a new video having a merged image for each newly-created frame.

In these manners, the movement of video cameras is accounted for by performing a frame-level registration in 3D space using camera poses. The correspondences between spatial points in 3D space and pixels in the image space of the frames are then leveraged to perform pixel-level registration. This enables the system to be robust against illumination changes and the presence or absence of different objects that may be contained or omitted in different videos.

With the frame-level and pixel-level registrations completed, the videos can be jointly synthesized, such as by performing one or more manipulations on at least one video based on another video. Example types of image manipulations of videos include: video in painting, completion, or hole filling; video perspective correction or rectification; video beautification; video segmentation; time slice videography; video stabilization; video stitching; and combinations thereof.

In the following discussion, after some example terminology is set forth, an example environment is described that may employ the techniques described herein. Example implementations of systems, apparatuses, and techniques are then described, followed by a section explaining example procedural implementations. The procedures may be performed in the example environment and systems as well as in other environments and systems. However, performance of the example procedures is not limited to the example environment and systems, and the example environment and systems are not limited to performance of the example procedures.

Terminology Examples

Example descriptions or explanations of certain terms as used herein are set forth below. Each term is applicable to one or more, but not necessarily all, implementations presented herein. Some terms are further elucidated using one or more examples.

A "video" refers to a visually-discernable memorialization of a scene that is captured using a camera over some interval of time. The video includes visual data that retains a version of the scene from some camera pose that establishes a view into the scene. The visual data can be used to generate a visible reproduction of the scene as time elapsed during a recording. A video includes a sequence of "video frames" or "frames."

A "frame" refers to a set of visual data at one moment in time that is captured by a video camera. A "sequence" refers to an ordered recording, storing, or presenting of multiple frames over time that produces from multiple still frames the apparent movement provided by a display of a video. A frame includes multiple pixels. A "pixel" refers to a unit of recorded, stored, or displayed light, usually with color. Each pixel is typically rectangular, but other shapes may be used. A grid of pixels forms a frame of a video.

A "video synthesis" refers to a combination of different parts of two or more videos or the use of data from one video to manipulate another video. For example, portions of two or more frames can be combined into a merged image. Thus, a "merged image" refers to an image having visual data that is based on information from two or more videos. Generally, if first and second frames from first and second videos are being used to create a merged image for a frame of a synthesized video, a portion from the first frame and a portion from the second frame are extracted and combined to create the resulting merged image. For example, slices of paired frames from two videos captured at different times can be joined over a sequence of paired frames to produce a time slice video. As another example, frames of a first video that include a portion occupied by a car can be replaced by frames of a second video that lack the car in the corresponding portion and instead reveal a natural tree that is obscured by the car in the first video.

A "three-dimensional scene reconstruction" or "3D scene reconstruction" refers to a 3D map or model of a 3D scene or trajectory over which video cameras travel while capturing videos. The 3D scene reconstruction can be generated using, for instance, a structure-from-motion (SfM) technique that determines camera poses along the trajectories over which the videos are captured. Each camera pose can include a camera position and a camera orientation. The 3D scene reconstruction includes multiple spatial points. "Spatial points" or "3D points" refer to points at different coordinates of a 3D space. The 3D scene reconstruction can be sparsely populated with spatial points across a coordinate system. Each spatial point corresponds to at least one pixel in at least one frame of at least one video. However, some pixels, and perhaps many pixels, across multiple frames do not have a corresponding spatial point in the 3D scene reconstruction. The spatial points can provide "point guidance."

"Point guidance" refers to factors, constraints, formula terms, data, strategies, combinations thereof, and so forth that are used to register a video based on spatial points of a 3D scene reconstruction. For example, spatial points from a 3D scene reconstruction can be used to register linked frames at a pixel level to thereby align the linked frames. More specifically, two linked frames that each have a particular pixel corresponding to a same spatial point can be aligned based on the particular pixel.

"Linked frames" refer to two or more frames from two or more videos that have been associated with each other. The linking occurs if, for example, the two frames are determined to occur at relatively similar times and with similar camera poses. For a frame-level registration, a 3D scene reconstruction is generated using an SfM technique. As part of the 3D scene reconstruction, camera poses—both camera position and camera orientation—are estimated for each frame. The frame-level registration links frames from different videos based on camera position and camera orientation while also attempting to match similar time indexes along the sequence of frames of each video.

"Aligned frames" refer to two or more frames from two or more videos that have been aligned with each other on a pixel level in two-dimensional image space using the pixels of the two frames. The aligning of linked frames can be dependent on a 3D scene reconstruction if particular pixels in different linked frames each correspond to a same or common spatial point of the 3D scene reconstruction. These common spatial points can provide, for instance, point guidance for the computation of "flow vectors" such that the flow vectors between linked and aligned frames are more likely to cause a particular pixel in one frame to warp to a particular pixel in the aligned frame if both particular pixels correspond to a common spatial point.

A "flow vector" refers to a vector—a distance and a direction—that describes how a unit of a first frame is moved toward a matching unit in another frame. For a pixel-level registration process, the unit between two frames can be a pixel to align the linked frames. A point guidance factor constrains the computation of the flow vectors between linked frames at least for those pixels that correspond to a common spatial point of a 3D scene reconstruction. A "projection" or "projecting" refers to computing or identifying a pixel of a frame that corresponds to a spatial point of the 3D scene reconstruction. A given spatial point can thus be projected onto each frame that has a pixel corresponding to the given spatial point.

A "mesh" refers to a group of pixels. Instead of transferring individual pixels from a first frame to a second frame as part of a frame-based video synthesis, a mesh of pixels can be transferred from the first frame to the second frame. A frame of origination for such transfers is called a "source frame," and a destination frame for such transfers is called a "target frame." A transfer of a mesh from a source frame toward a target frame is called warping. A "warping" can therefore refer to how a matching mesh is transferred from the source frame toward a target frame in accordance with flow vectors and one or more warping factors. Also, an action, operation, or technique that is referred to as being applied "between linked frames" can pertain to or otherwise include being applied "among two or more linked frames."

Also, unless context dictates otherwise, use herein of the word "or" may be considered use of an "inclusive or," or a term that permits inclusion or application of one or more items linked by the word "or" (e.g., a phrase "A or B" may be interpreted as permitting or being relevant to just "A," to just "B," or to both "A" and "B"). Further, items represented in the accompanying figures and terms discussed herein may be indicative of one or more items or terms, and thus reference may be made interchangeably to single or plural forms of the items and terms in this description.

Example Environment

FIG. 1 illustrates an environment having a system 100 for example implementations that are operable to realize multi-video registration for video synthesis with a video synthesis module 124. As illustrated, the example system 100 includes at least one computing device 102 and at least one user input/output (I/O) device 114. The computing device 102 includes a processing system 106 and a memory 108. The processing system 106 includes an operating system 110. The memory 108 stores an application 112, which includes the video synthesis module 124. Example implementations for the computing device 102 and the video synthesis module 124 are described further below in this section. For the illustrated example environment, FIG. 1 shows an end user 104 and a user interaction between the end user 104 and the user I/O device 114 that produces a user control signal 116.

The computing device 102 is shown displaying a merged image 126 that is produced as a result of a video synthesis operation 134. The environment further includes multiple videos 128, such as a first video 128-1 and a second video 128-2. Each respective video 128 includes one or more respective sequences 132, with each sequence 132 including multiple frames 130. Thus, the first video 128-1 includes at least one first sequence 132-1 having multiple frames 130, such as a first frame 130-1. And the second video 128-2 includes at least one second sequence 132-2 having multiple frames 130, such as a second frame 130-2.

The application 112 may be realized as some kind of imaging application, such as a video editing application, a video organization application, a camera application, a social networking application, a cloud storage application, or some combination thereof. The imaging application creates or displays a merged image 126 responsive to user input realized as the user control signal 116. For example, the imaging application empowers the end user 104 to have the computing device 102 create the merged image 126 from two or more videos 128 in an automated manner via the video synthesis operation 134.

Generally, the video synthesis module 124 can perform a video synthesis operation 134 with regard to multiple videos 128. The video synthesis operation 134 is performed on multiple videos 128 (e.g., two videos 128 as shown) to register the videos 128 at the frame level and at the pixel level. As described herein, the video synthesis module 124 obtains a 3D scene reconstruction, which includes spatial points, and associated camera poses for each frame 130 based on the videos 128. The video synthesis module 124 uses the camera poses of the 3D scene reconstruction to link frames 130. The video synthesis module 124 then aligns the linked frames at the pixel level with regard to flow vectors using the spatial points identified in the 3D scene reconstruction. The flow vectors are used to warp a mesh, which includes a group of pixels, from the first frame 130-1 to the second frame 130-2. An example video synthesis operation 134 to create a merged image 126 is described herein with reference to FIG. 3.

The video synthesis operation 134 includes combining portions of linked and aligned frames to create the merged image 126. As shown, the video synthesis module 124 combines portions of the first frame 130-1 and the second frame 130-2 to create the merged image 126. The first frame 130-1 includes an "A" portion and a "B" portion. The second frame 130-2 includes a "C" portion and a "D" portion. To perform the video synthesis operation 134, the video synthesis module 124 takes the "A" portion from the first frame 130-1 and the "D" portion from the second frame 130-2. Using the pixel-level frame alignment, the video synthesis module 124 combines the pixels of the "A" portion with the pixels of the "D" portion to create the merged image 126.

The computing device 102 can be implemented as any suitable type of computing device. Examples of end-user implementations for the computing device 102 include a desktop computer, a laptop or notebook computer, a mobile device (e.g., assuming a handheld configuration such as a tablet, a phablet, or a mobile phone), a mobile device coupled to a separate screen, an entertainment appliance such as a smart television, a game console, a wearable computing device such as a smart watch or intelligent glasses, a virtual or augmented reality device, or some combination thereof. Thus, an end-user implementation of the computing device 102 may range from a relatively high-resource device with substantial memory and processor resources (e.g., a personal computer or game console) to a relatively low-resource device with constrained memory or processing resources (e.g., a mobile device such as a wearable computer). Examples of data center or server device implementations for the computing device 102 include a web server, a server running open source software, a server of a proprietary design, a stand-alone server, a server blade, an allocated portion of a server farm, server functionality that is distributed across at least one data center, cloud computing functionality, or some combination thereof.

The computing device 102 is illustrated as including a variety of hardware components: a processing system 106, an example of a computer-readable storage medium illustrated as memory 108, and so forth. Other hardware components are also contemplated as described herein with reference to FIG. 14. The processing system 106 is representative of functionality to perform operations through execution of instructions stored in the memory 108. Thus, execution of the instructions by the processing system 106 causes the computing device 102 to perform operations that are described herein. Although illustrated as two separate components, functionality of the processing system 106 and the memory 108 may be combined into one component (e.g., on an application specific integrated circuit (ASIC) or as instructions are loaded from the memory onto a processor) or may be further divided into a greater number of components. The computing device 102 is further illustrated as including an operating system 110. The operating system 110 is configured to abstract underlying hardware functionality of the computing device 102 to the application 112 that is executable on the computing device 102. Examples of a user I/O device 114 include a keyboard, a mouse, a touchpad, an accelerometer, a touch screen, a microphone, a camera, a display device such as a screen or projector, a speaker, or some combination thereof. The user I/O device 114 may be separate from or integrated with the computing device 102.

In example implementations, the video synthesis module 124 is located at or executing on the computing device 102, such as by being part of the application 112 or the operating system 110. The video synthesis module 124 represents functionality to implement schemes and techniques for multi-video registration for video synthesis as described herein. The video synthesis module 124 can be implemented as at least part of a software package that executes on and specially configures one or more processors, which processors may physically realize the processing system 106; as a hardware apparatus, which may be realized as an ASIC or as the computing device 102; or using a combination of software, firmware, hardware, or fixed logic circuitry; with some combination thereof; and so forth. As described herein with reference to FIG. 14, the video synthesis module 124 may alternatively be fully or partially implemented as a web or cloud based video-handling service, such as one that facilitates the editing, storing, organizing, or manipulating of videos.

Systems and Techniques

Figure 2:
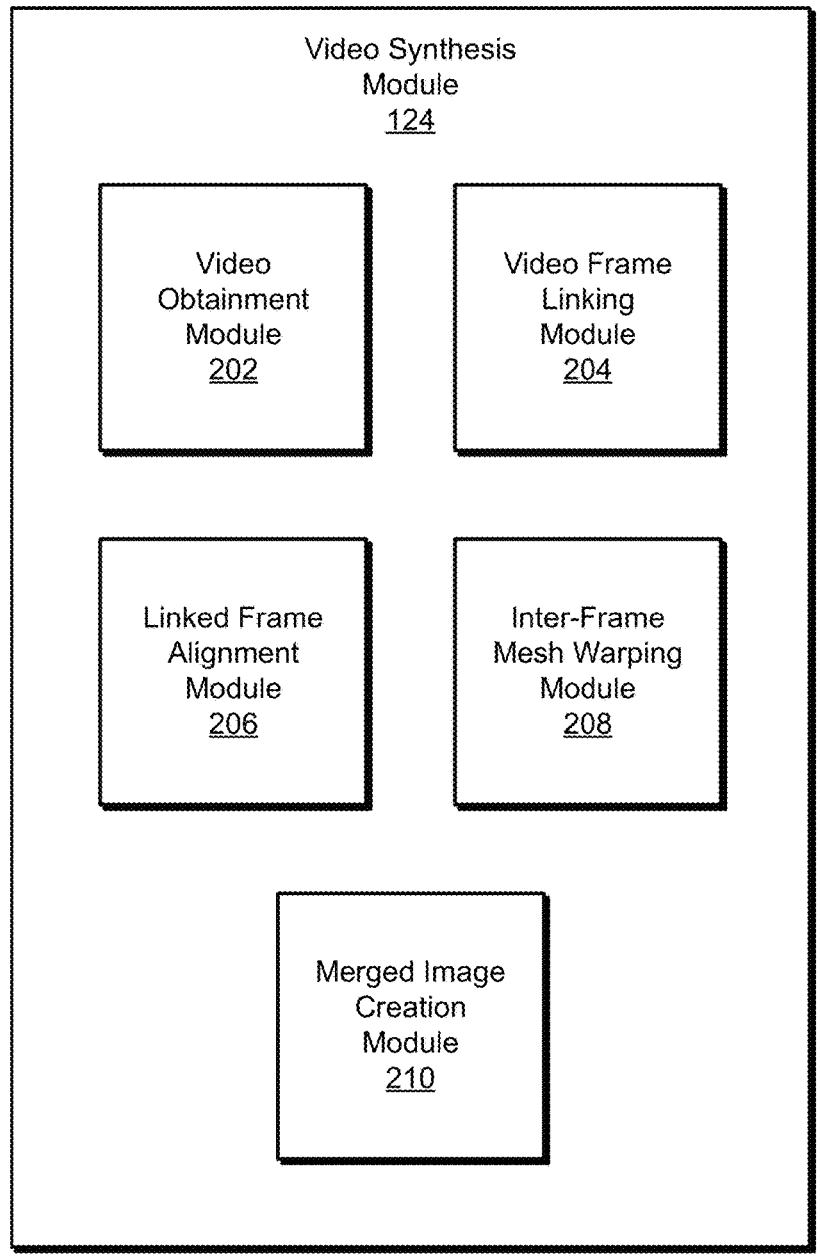
FIG. 2 illustrates an example of the video synthesis module including five modules respectively corresponding to five phases that are depicted in FIG. 3.

FIG. 2 illustrates an example of the video synthesis module 124. As shown, the video synthesis module 124 includes a video obtainment module 202, a video frame linking module 204, a linked frame alignment module 206, an inter-frame mesh warping module 208, and a merged image creation module 210. The five modules 202-210 of the video synthesis module 124 respectively correspond to five phases 302-310 of FIG. 3, which are described below.

In example implementations, the video obtainment module 202 obtains multiple videos 128, with each respective video 128 including a respective sequence 132 of multiple frames 130. This obtainment of the videos 128 corresponds to a first phase 302 of FIG. 3. The video frame linking module 204 links respective frames 130 of respective ones of the multiple videos 128 to produce linked frames 130 using a 3D scene reconstruction generated from the multiple videos 128 along with estimated camera poses for each frame. This frame-level registration performed by the video frame linking module 204 corresponds to a second phase 304 of FIG. 3. Example operations of the module 204 are also described with reference to FIGS. 4 and 5.

The linked frame alignment module 206 aligns the linked frames 130 with flow vectors computed using point guidance to produce aligned frames 130. The point guidance is based on spatial points identified in the 3D scene reconstruction that are projected onto corresponding pixels in the linked frames 130. The aligned frames 130 include source frames 130-S that are respectively aligned with target frames 130-T. This pixel-level registration performed by the linked frame alignment module 206 corresponds to a third phase 306 of FIG. 3. Example operations of the module 206 are also described with reference to FIGS. 6-8.

The inter-frame mesh warping module 208 warps a mesh from a source frame 130-S to a target frame 130-T based on flow vectors computed during the pixel-level registration. The inter-frame mesh warping module 208 corresponds to a fourth phase 308 of FIG. 3. Example operations of the module 208 are also described with reference to FIG. 9. The merged image creation module 210 creates at least one merged image 126 using the target frame 130-T and the meshes as warped from the source frame 130-S. The merged image creation module 210 corresponds to a fifth phase 310 of FIG. 3. Example operations of the module 210 are also described with reference to FIG. 10.

The five modules 202-210 of the video synthesis module 124 as depicted in FIG. 2 can each be resident at or executing on an end-user computing device 102 of FIG. 1. Additionally or alternatively, the five modules 202-210 of the video synthesis module 124 can each be resident at or executing on at least one server of a data center as part of cloud computing functionality. Further, one or more of the modules 202-210 can be resident at or executing on at least one server of a data center as part of cloud computing functionality, and one or more other ones of the modules 202-210 of a video synthesis module 124 can be located at or executing on a client-side computing device, with the modules interacting with one other.

Figure 3:
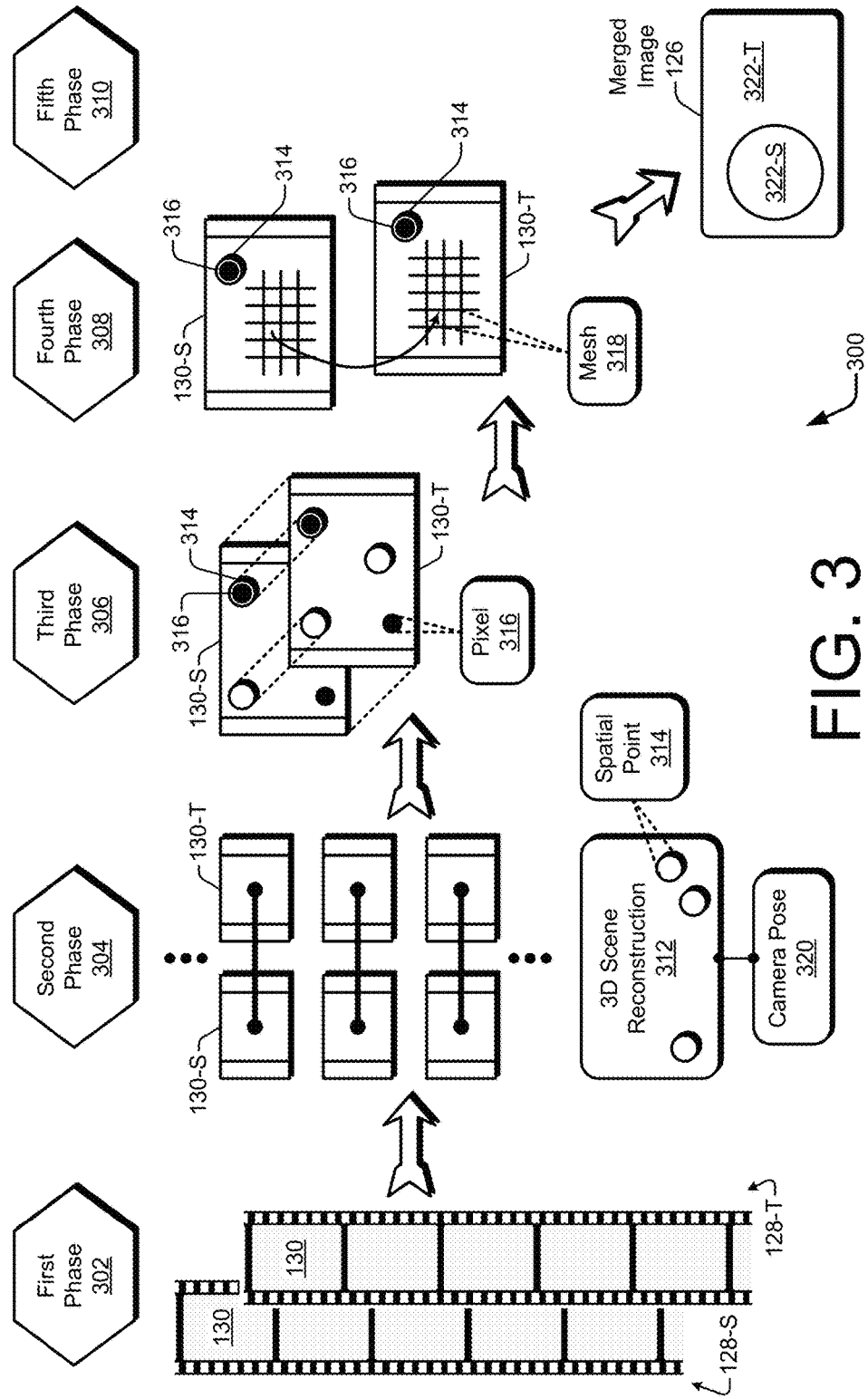
FIG. 3 illustrates an example scheme for multi-video registration for video synthesis having five phases that are performed by the video synthesis module of FIG. 2.

FIG. 3 illustrates an example scheme 300 for multi-video registration for video synthesis having five phases 302-310 that are respectively performed by the modules 202-210 of the video synthesis module 124. The scheme 300 is described from left to right. The five phases depicted along the top row are: a first phase 302 to obtain videos, a second phase 304 to link frames of the obtained videos, a third phase 306 to align the linked frames, a fourth phase 308 to warp meshes of the aligned frames, and a fifth phase 310 to create merged images 126 from the aligned frames. Although the phases are described sequentially, the video synthesis module 124 can perform the phases at least partially in parallel or in an overlapping manner.

Initially, as part of the first phase 302 for obtaining videos, the video obtainment module 202 obtains multiple videos 128, such as a source video 128-S and a target video 128-T, both of which have multiple frames 130. The videos 128 can be obtained directly or indirectly from separate or integrated camera hardware, from local memory, from a remote source such as cloud storage via one or more networks, from a camera application, from an operating system, from some combination thereof, and so forth. Although more than two videos 128 can be used in a video synthesis operation, implementations are primarily depicted in the drawings and described herein with regard to two videos for the sake of clarity.

In the second phase 304 for linking frames of videos, the video frame linking module 204 registers sequences 132 (of FIG. 1) of videos 128 at a frame level. To do so, the video frame linking module 204 obtains a 3D scene reconstruction 312 that is based on the multiple videos 128. The 3D scene reconstruction 312 includes, for example, multiple spatial points 314 dispersed across or located in 3D space. The 3D scene reconstruction 312 is associated with multiple camera poses 320. Each spatial point 314 corresponds to at least one pixel of at least one frame 130 of at least one video 128. The 3D scene reconstruction 312 can be generated using, for instance, a structure-from-motion (SfM) algorithm that determines the camera poses 320 of the camera taking the videos 128 at each frame 130. The video frame linking module 204 can alternatively obtain the 3D scene reconstruction 312 from another application or system that uses the videos 128 to generate the 3D scene reconstruction 312. The frames 130 of the source video 128-S are referred to as source frames 130-S, and the frames 130 of the target video 128-T are referred to as target frames 130-T. However, any given video 128, as well as the frames 130 thereof, can be designated as the source or the target. The video frame linking module 204 links frames 130, such as a source frame 130-S and a target frame 130-T, between the two videos 128-S and 128-T based on the multiple camera poses 320 that are determined along with the 3D scene reconstruction 312. Generally, frames 130 having a similar camera position and camera orientation are linked together. The second phase 304 for linking frames of videos is further described with reference to FIGS. 4 and 5.

In the third phase 306 for aligning linked frames, the linked frame alignment module 206 registers frames 130 at a pixel level. The linked frame alignment module 206 projects spatial points 314 of the 3D scene reconstruction 312 onto each frame 130. Pre-warping from a source frame 130-S to a linked target frame 130-T can be performed using a global homography transformation that is based on the projected spatial points 314. The linked frame alignment module 206 matches pixels 316 between the source frame 130-S and the target frame 130-T to compute flow vectors for dense scale invariant feature transform (SIFT) descriptors. The flow vectors are computed based on a data factor, a smoothness factor, and a point guidance factor. The linked frame alignment module 206 uses the point guidance factor to nudge flow vectors in a direction such that a pixel 316 in the source frame 130-S that corresponds to a particular spatial point 314 of the 3D scene reconstruction 312 is more likely to be matched to a pixel 316 in the target frame 130-T that also corresponds to the particular spatial point 314. A bi-directional consistency check may also be performed for each pair of pixels 316 and associated flow vector. The computed flow vectors serve to align the linked frames 130 at the pixel level. The third phase 306 for aligning linked frames is further described with reference to FIGS. 6-8.

In the fourth phase 308 for warping meshes of aligned frames, the inter-frame mesh warping module 208 determines where meshes 318 of the source frame 130-S are warped onto the target frame 130-T. The inter-frame mesh warping module 208 warps each mesh 318 based on a data factor, a shape preservation factor, and a temporal similarity factor. The temporal similarity factor enforces a degree of temporal consistency. Based on the temporal similarity factor, the inter-frame mesh warping module 208 nudges warped meshes 318 so as to reduce the amount of warping change or difference for a given mesh 318 between proximate frames 130, such as between consecutive frames 130, along a sequence 132. The fourth phase 308 for warping meshes of aligned frames is further described with reference to FIG. 9.

In the fifth phase 310 for creating merged images, the merged image creation module 210 combines at least one portion 322-S of the source frame 130-S with at least one portion 322-T of the target frame 130-T to create the merged image 126. The creation of the merged image 126 can be performed in conjunction with the warping of meshes as determined in the fourth phase 308. The fifth phase 310 for creating merged images is further described herein with reference to FIG. 10. By using the linked frames 130 that are produced in the second phase 304, the operations of the third, fourth, and fifth phases 306, 308, and 310 are performed for each pair of linked frames 130. Thus, respective merged images 126 can be created for each respective pair of linked frames 130 to thereby synthesize the two videos 128-S and 128-T to produce a new video having a merged image 126 representing each newly-created frame.

Figure 4:
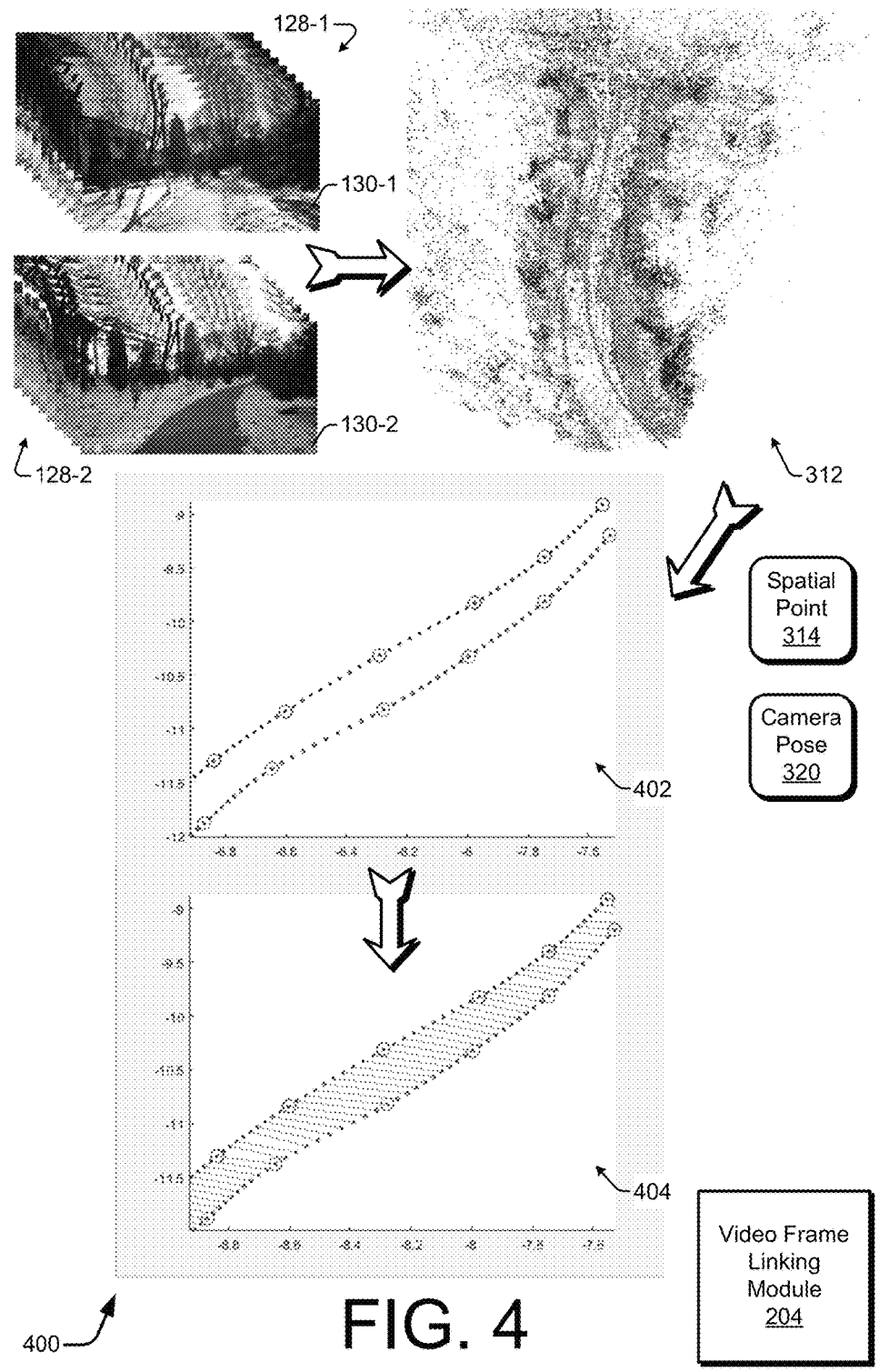
FIG. 4 illustrates an example approach to linking the frames of multiple videos.

FIG. 4 illustrates an example approach 400 for linking frames 130 of videos 128 for the second phase 304. As shown, the approach 400 includes a first video 128-1 having a first frame 130-1 and a second video 128-2 having a second frame 130-2. Each video 128 records a scene of a paved walkway between houses on the left and parkland on the right as the camera moves along a trajectory that follows the paved walkway. At each frame 130, the camera corresponds to a camera pose 320, which can include both a camera position and a camera orientation. The trajectory does vary somewhat for each video 128, and the illumination provided by sunlight also differs.

A 3D scene reconstruction 312 is generated from the two videos 128. Structure-from-motion (SfM) techniques, for example, can determine (e.g., calculate or estimate) 3D scene structures and camera poses 320 from the 2D images of the frames 130. SfM techniques can be roughly divided into incremental techniques and global techniques. Incremental techniques register cameras one by one and are usually considered to be slower. Further, incremental techniques are subject to large drifting errors. Global techniques, on the other hand, register multiple cameras simultaneously and can be more efficient and accurate. Hence, an example technique described herein takes a global approach to SfM to register the frames 130 of the videos 128 in 3D space. An example global SfM implementation is described with reference to FIG. 5. However, an incremental or another type of SfM technique may alternatively be employed. Further, non-SfM methods may be employed to generate a 3D scene reconstruction 312.

In operation, to reduce the processing requirements, the video frame linking module 204 extracts key frames 130 from each input video 128. The key frames are typically extracted at equal intervals. Each of the key frames from the two videos 128 are fed into a global SfM system. The global SfM system generates a sparse 3D scene reconstruction 312, as shown in FIG. 4. The video frame linking module 204 interpolates the camera poses 320 of the inter frames 130 in the videos 128 based on an assumption that the camera poses 320 of inter frames positioned between key frames are usually smoothly changed. Alternatively, a result that will take longer or involve more processing resources, but will likely be more accurate, can be achieved by processing both key frames and inter frames individually.

A graph 402 depicts a sequence of frames of two different videos using dots that form an upper and a lower line. The key frames are represented with encircled dots, and the inter frames are represented with dots alone. With the camera poses 320 of both the key frames and the inter frames determined, the video frame linking module 204 implements dynamic time warping to link matching frames in the different videos based on determined camera poses 320. As part of the dynamic time warping, competing factors are balanced. On the one hand, the frames are linked based on being proximate in 3D space to ameliorate the parallax effect. On the other hand, the frames are linked such that the resulting images thereof are temporally consistent. A graph 404 depicts linkages between pairs of matched frames, with the linkages represented as horizontal lines extending between the dots.

Figure 5:
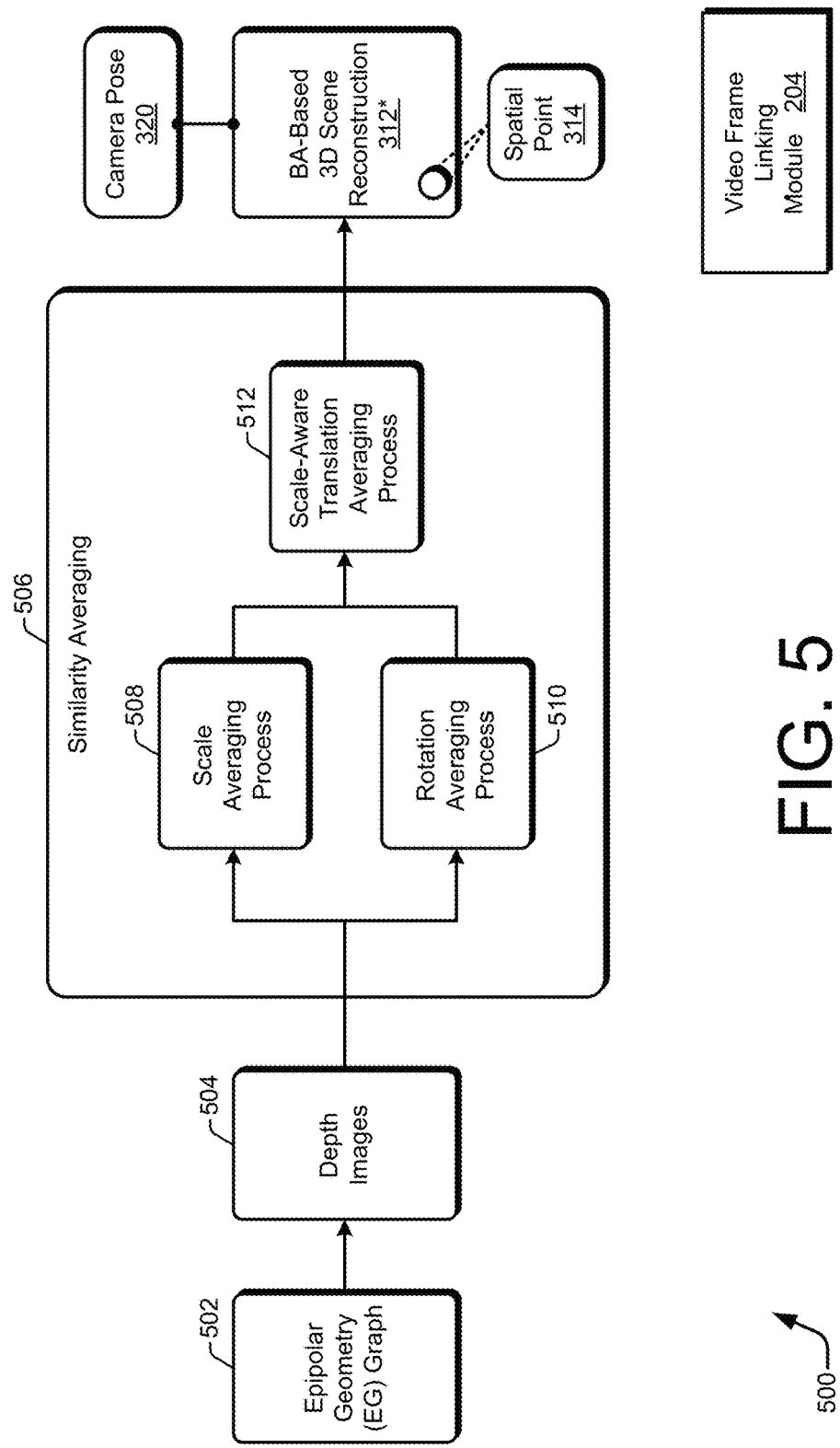
FIG. 5 illustrates an example implementation for generating a three-dimensional scene reconstruction to facilitate the linking of frames of multiple videos.

FIG. 5 illustrates an example implementation for generating a 3D scene reconstruction to facilitate the linking of frames of multiple videos. The implementation is depicted as a pipeline 500. The pipeline 500 starts with an epipolar geometry (EG) graph 502 with cameras represented as vertices in order to solve the camera positions and orientations in a global coordinate system. The video frame linking module 204 constructs a depth image 504 for each camera. This construction phase can further include performing a depth consistency check to exclude noisy essential matrices. The essential matrix on an edge of the EG graph 502 encodes the relative rotation and the relative translation direction of the two cameras for the vertex endpoints of the edge.

Following the construction of the depth images 504, one or both of two EG filters (not shown) can be deployed. First, a local bundle adjustment (BA) process is applied to images in a local stellate graph to improve pairwise relative motion and to also exclude some poor essential matrices. Second, a missing correspondence analysis filter is applied between image pairs to exclude outlier essential matrices due to repetitive scene structures.

Generally, a similarity averaging process 506 is performed next to register the cameras in the global coordinate system. A local relative similarity transformation is computed for each edge of the EG graph 502. As part of the similarity averaging process 506, camera orientations are solved with a rotation averaging process 510. In parallel, the global scale of each depth image 504 is solved with a scale averaging process 508. Once the scales and rotations are fixed, baseline lengths and then camera positions are solved by a scale-aware translation averaging process 512. Intuitively, this amounts to stitching the depth images 504 together to form a global 3D reconstruction of a scene. Once the cameras are fixed, a multiple view triangulation process is applied to compute the scene structure in 3D space. An output BA process can also be applied to bind the camera poses 320 and 3D spatial points 314 together. Thus, the video frame linking module 204 can generate a BA-based 3D scene reconstruction 312* with a global SfM technique.

Figure 6:
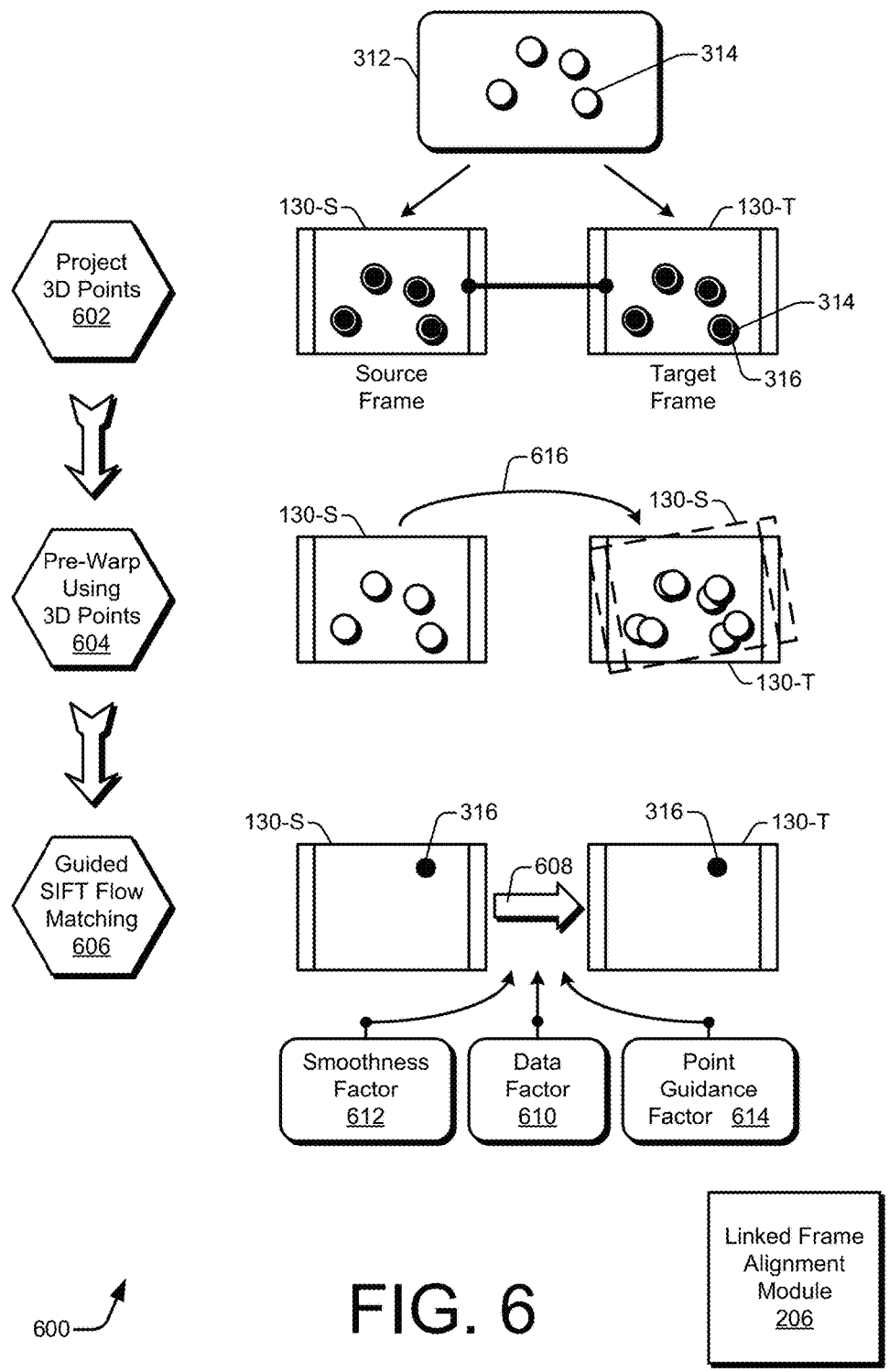
FIG. 6 illustrates part of an example approach to aligning linked frames of multiple videos, with FIG. 6 depicting the first through the third of four sub-phases.

FIG. 6 illustrates part of an example approach 600 for aligning linked frames 130 of multiple videos 128 for the third phase 306, with FIG. 6 depicting the first through the third of four sub-phases. The illustrated approach 600 is directed to the pixel-level registration using a guided scale invariant feature transform (SIFT) flow algorithm with sparse spatial points 314 of the 3D scene reconstruction 312 as determined with a global SfM technique. The three sub-phases depicted in FIG. 6 are: a first sub-phase 602 to project 3D points, a second sub-phase 604 to pre-warp a frame using the 3D points, and a third sub-phase 606 to match pixels using a guided SIFT flow technique. A fourth sub-phase 802 to check for flow vector consistency is described below with reference to FIG. 8.

In the first sub-phase 602, the linked frame alignment module 206 projects the spatial points 314 from the 3D scene reconstruction 312 onto the source frame 130-S and the linked target frame 130-T. Thus, certain pixels 316 of each frame are established to correspond to a 3D point 314. Consequently, a pixel 316 in the source frame 130-S may correspond to a same spatial point 314 as a pixel 316 in the target frame 130-T.

The sparse 3D points 314 are projected onto each frame 130 by:

$$[x_i^j, y_i^j, 1]' = \lambda K_i [R_i | -R_i c_i] P^j,$$

where $K_i$ is the intrinsic matrix for camera i, $R_i$ and $c_i$ are the camera rotation and position after interpolation, and $P^j$ is the homogenous coordinate of a 3D point 314. The visibilities of points 314 for each inter frame are maintained the same as for the previous key frame.

In the second sub-phase 604, the linked frame alignment module 206 pre-warps one frame 130 onto the other. For example, the source frame 130-S can be pre-warped onto the target frame 130-T based on the projected 3D points 314. Each 3D point 314 provides a correspondence between linked frames 130. The linked frame alignment module 206 computes a global homography transformation between the linked frames 130 based on the pixel correspondences as established by the 3D points 314. The linked frame alignment module 206 then pre-warps 616 the source frame 130-S toward the target frame 130-T based on the global homography transformation.

In the third sub-phase 606, the linked frame alignment module 206 matches pixels 316 between the source frame 130-S and the target frame 130-T using flow vectors 608. The flow vector matching is performed based on a data factor 610, a smoothness factor 612, and a point guidance factor 614. The data factor 610 constrains the difference between SIFT descriptors to be matched along the flow vector 608. The smoothness factor 612 constrains the flow vectors 608 of proximate pixels (e.g., adjacent pixels or those within some neighborhood) to be similar. The point guidance factor 614 constrains the resulting flow vectors 608 to match along with pixels 316 that correspond to respective common 3D points 314. Examples of the point guidance factor 614 are described further with reference to FIG. 7.

A quantitative example of guided SIFT flow matching is described as follows. After pre-warping, the linked frame alignment module 206 computes dense SIFT descriptors on the target frame 130-T and the pre-warped source frame 130-S. Let $S_1$ and $S_2$ represent the computed SIFT images. The matching can then be computed with the following energy function:

$$E = E_{Data} + E_{Smooth} + E_{GuidedPoints}$$

where $$E_{Data} = \sum_p \min(|S_1(p) - S_2(p + w(p))|, d_0)$$

serves as the data term that constrains the difference between SIFT descriptors to be matched along the flow vector $w(p) = [u(p), v(p)]$.

$$E_{Smooth} = \sum_{(p,q) \in \epsilon} \min(\alpha_1 |u(p) - u(q)|, d_1) + \min(\alpha_1 |v(p) - v(q)|, d_1)$$

is the smoothness term that constrains the flow vectors of adjacent pixels to be similar, with $\in$ is representative of spatial neighborhoods.

$$E_{GuidedPoints} = \sum_{p \in \psi} \min f(p),$$

$$f(p) = \begin{cases} 0, & \text{if } \|w(p) - \tilde{w}(p)\| \le d, \\ \alpha_2, & \text{if } \|w(p) - \tilde{w}(p)\| > d. \end{cases}$$

is the guided point term that constrains the projected 3D point $p \in \psi$ on the image to be matched to its correspondence along the flow vector. The variable $\tilde{w}(p)$ represents the flow vector computed from the corresponding projected 3D points 314. The truncated $L_1$ norms are used for the data and smooth terms with different thresholds $d_0$ and $d_1$.

Figure 7:
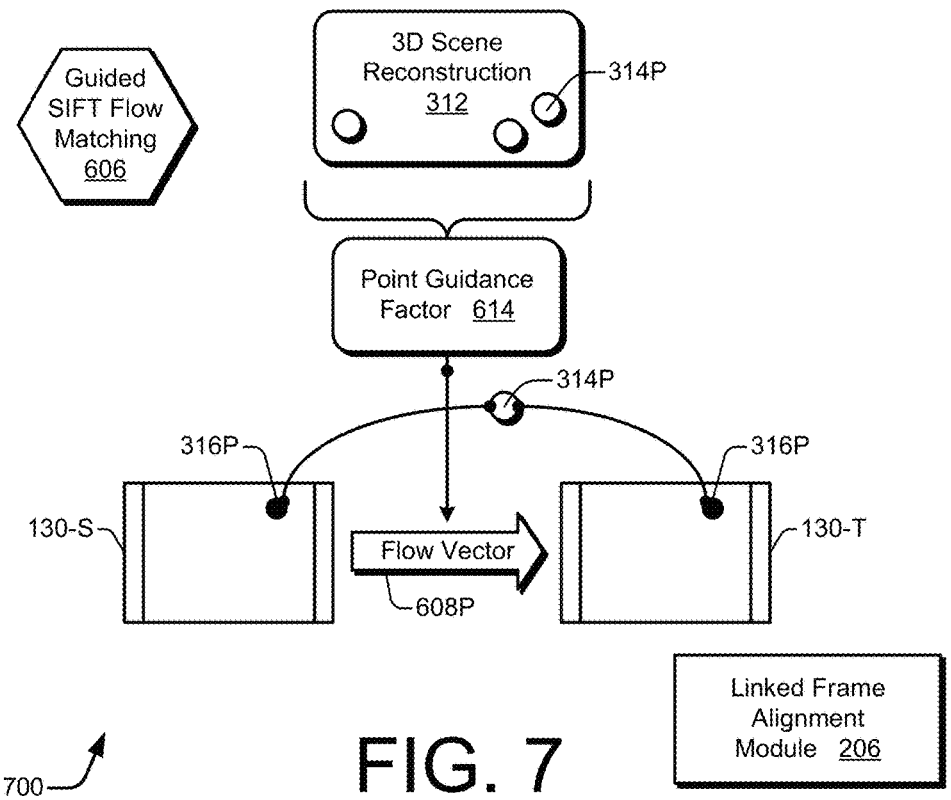
FIG. 7 illustrates an example approach for guided SIFT flow matching to support the third phase of the four sub-phases for aligning the linked frames of multiple videos.

FIG. 7 illustrates an example approach 700 for a guided SIFT flow matching sub-phase, which is the third sub-phase 606 of the four sub-phases for aligning the linked frames 130 of multiple videos 128. The SIFT flow matching is guided by 3D points 314 of the 3D scene reconstruction 312. The point guidance factor 614 constrains the computation of the flow vector 608 as part of the pixel-level registration of the linked frames 130. The 3D scene reconstruction 312 includes a particular 3D point 314P that represents a real-world, physical point in space along the trajectory of the cameras that filmed the scene. The particular 3D point 314P may represent a corner of a car bumper, for instance. This particular 3D point 314P corresponds to a particular pixel 316P in the source frame 130-S and another particular pixel 316P in the target frame 130-T. Thus, the particular 3D point 314P is common to both frames. The particular pixel 316P in both linked frames 130 has been determined to represent an image of the physical point in space—e.g., the corner of the car bumper here. This correspondence is used to guide the determination of one or more flow vectors 608, such as at least the particular flow vector 608P for the particular pixel 316P. With the flow vectors 608 from the source frame 130-S to the target frame 130-T computed, the linked frame alignment module 206 has aligned the frames 130 as linked by the video frame linking module 204.

Figure 8:
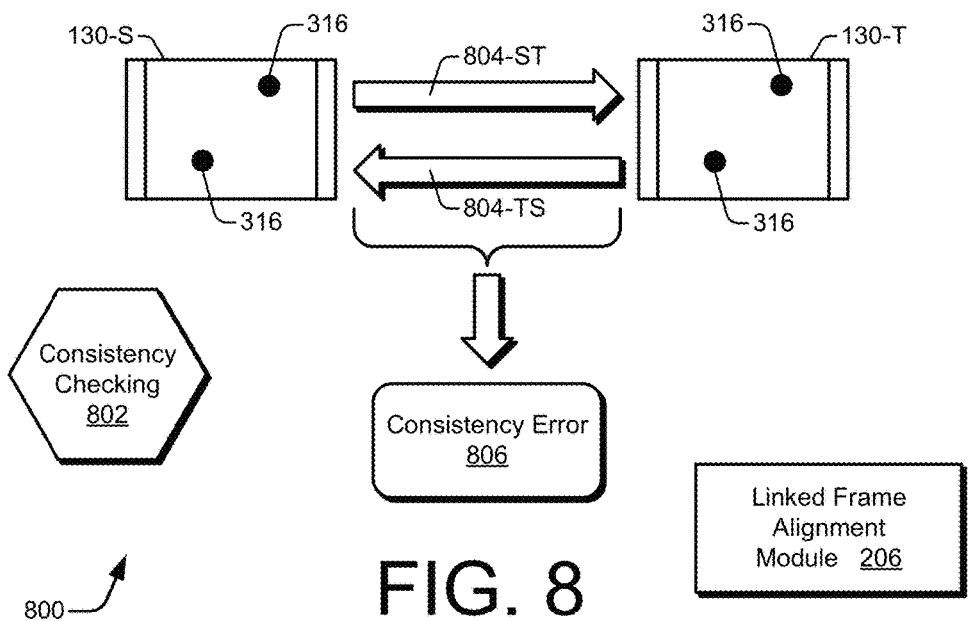
FIG. 8 illustrates another part of the example approach to aligning linked frames of multiple videos, with FIG. 8 depicting the fourth phase of the four sub-phases.

FIG. 8 illustrates another part 800 of the example approach for aligning linked frames 130 of multiple videos 128, with FIG. 8 depicting the fourth sub-phase 802 for consistency checking. After the first, second, and third sub-phases 602, 604, and 606 (of FIGS. 6 and 7), the linked frame alignment module 206 can perform a bi-directional consistency check. A flow vector 804-ST flows from a source pixel 316 of the source frame 130-S to a target pixel 316 of the target frame 130-T, and a flow vector 804-TS flows from the target frame 130-T to the source frame 130-S. These two bi-directional flows 804 are compared to determine a consistency error 806, and a correspondence existing between the source pixel and the target pixel is conditionally removed. If the consistency error 806 exceeds a threshold, the flow vector is discarded.

From a quantitative perspective, the linked frame alignment module 206 can compute the flows 804 in bi-directions from the pre-warped source frame 130-S and the target frame 130-T. With the bi-directional flows, the consistency error 806 is computed using, for example:

$$e_c(p)=\|u(p)+u'(q)\|+\|v(p)+v'(q)\|$$

where q is a corresponding pixel 316 on the target frame 130-T for a pixel p on the source frame 130-S. If $e_c(p)>0$, the matching is considered unreliable, and the correspondence is removed.

After the consistency checking sub-phase, or fourth sub-phase 802, the video synthesis module 124 has produced semi-dense correspondences between linked and aligned frames 130. In accordance with a desired video manipulation, the video synthesis module 124 then attempts to warp the source video sequence towards the target video sequence. For a time slice video example of video manipulation, the video synthesis module 124 synthesizes a time slice video by taking slices from the target video sequence and the warped video sequence of the source video sequence. Because matched images may contain different objects, pixel-based warping is difficult and risks producing a visually uneven result. Consequently, mesh-based warping is adopted for the video synthesis.

Figure 9:
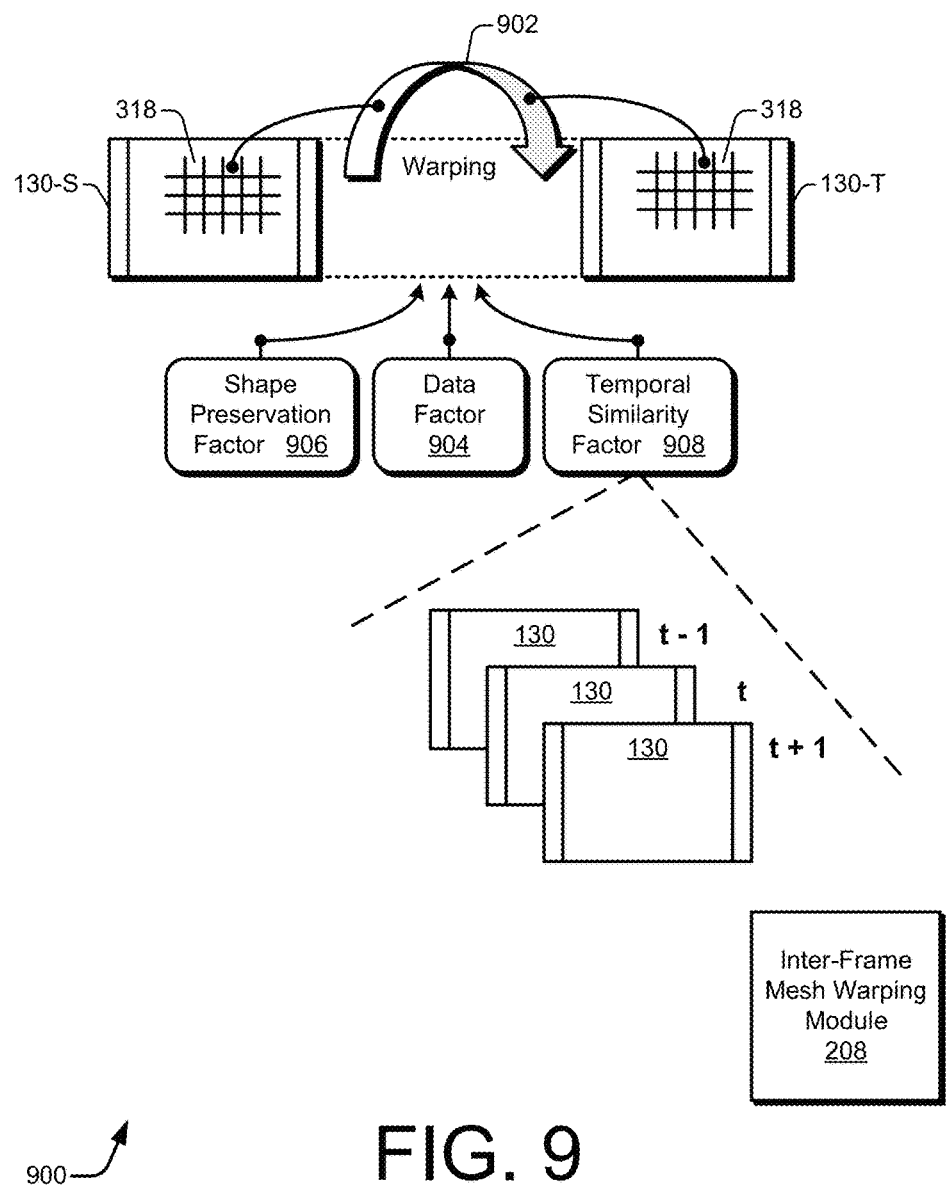
FIG. 9 illustrates an example approach to warping meshes between two aligned frames of multiple videos.

FIG. 9 illustrates an example approach 900 for warping meshes 318 between two aligned frames 130 of multiple videos 128. In this fourth phase 308, the inter-frame mesh warping module 208 performs a warping 902 of meshes 318 from the source frame 130-S to the target frame 130-T based on multiple factors. Each mesh 318 includes multiple pixels 316. The multiple factors include a data factor 904, a shape preservation factor 906, and a temporal similarity factor 908.

The data factor 904 represents the feature included in a given mesh 318. The shape preservation factor 906 constrains the distortion of grids to be small.

The temporal similarity factor 908 constrains corresponding meshes 318 of temporally proximate (e.g., near, temporally adjacent, or consecutive) frames 130 to be similar to each other. For example, for a frame 130 $t$, the inter-frame mesh warping module 208 warps the meshes 318 thereof such that corresponding meshes of the frame 130 $t-1$ or of the frame $t+1$ are likely to be similar. This nudges the warpings 902 such that changes to corresponding meshes 318 between consecutive frames 130 are reduced.

From a quantitative perspective, the inter-frame mesh warping module 208 performs warpings 902 of meshes 318 from the source frame 130-S to the target frame 130-T based on the following example energy function:

$$E(\hat{V})=E_d(\hat{V})+\alpha E_s(\hat{V})+\beta E_t(\hat{V})$$

where $$E_d(\hat{V}) = \sum_p \|\hat{V}_p w_p - \hat{p}\|$$

is the data term. As p can be represented by four enclosing grid vertices $V_p=[v_p^1, v_p^2, v_p^3, v_p^4]$ with weights $w_p$, the expectation is that its corresponding feature $\hat{p}$ can be represented with the same weights $w_p$ by the warped grid vertices $\hat{V}_p=[\hat{v}_p^1, \hat{v}_p^2, \overline{v}_p^3, \hat{v}_p^4]$.

$$E_s(\hat{V}) = \sum_v \|\varepsilon(v, \hat{v})\|$$

is the shape preserving term which constrains the distortion of grids to be as small as possible responsive to the similarity distortion function $\varepsilon (v, \hat{v})$. The temporal similarity term is:

$$E_t(\hat{V}) = \sum_{\hat{v}_{t-1}} \|\varepsilon(\hat{v}_{t-1}, \hat{v}_t)\|$$

This term constrains the corresponding meshes of at least consecutive frames to be similar too. The variables $\alpha$ and $\beta$ are empirically-determined weights. In order to improve the processing efficiency, some number of points (e.g., 1000 points) from the semi-dense correspondences can be selected as the feature points.

Figure 10:
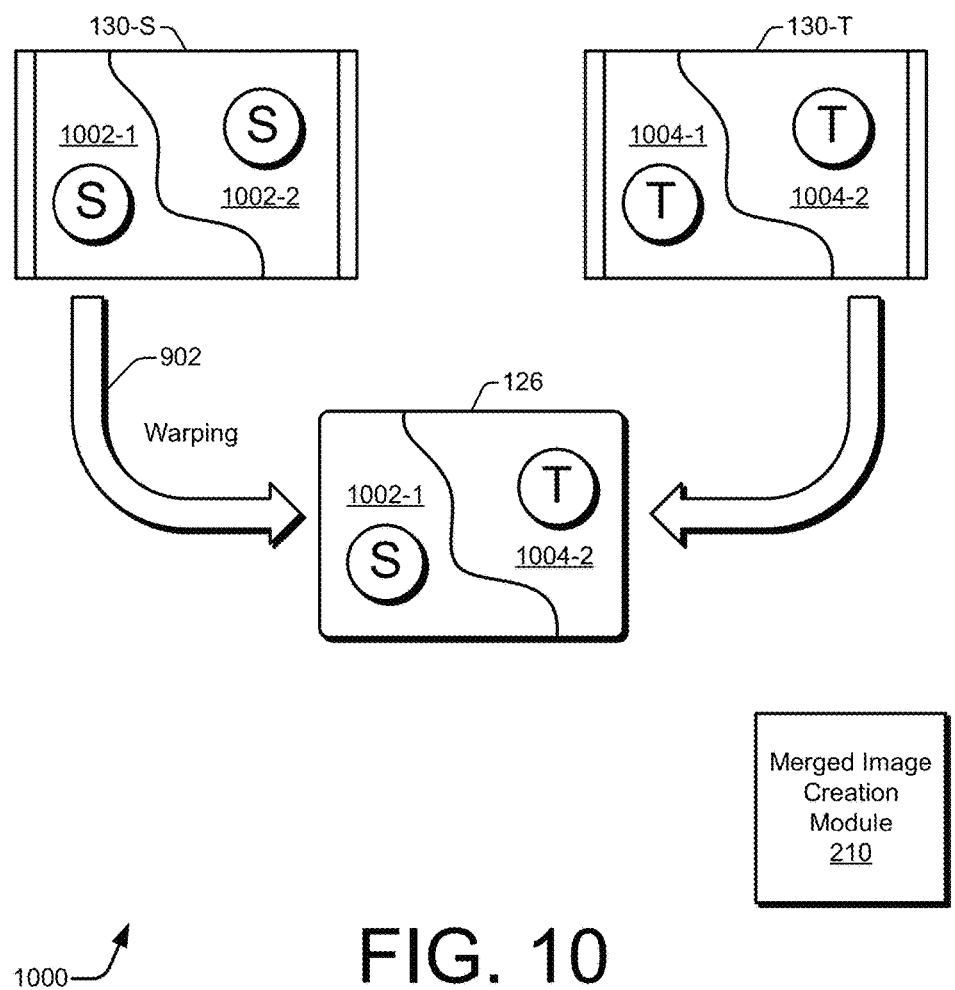
FIG. 10 illustrates an example approach to creating a merged image using different portions, which are formed of meshes, from two different frames of multiple videos.

FIG. 10 illustrates an example approach 1000 for creating a merged image 126 using meshes from two different frames 130 of multiple videos 128. The fifth phase 310 to create merged images may be performed in conjunction with the fourth phase 308 of FIG. 9. In other words, phases 308 and 310 can be performed simultaneously, in an overlapping manner, together jointly, and so forth. Thus, the inter-frame mesh warping module 208 and the merged image creation module 210 can operate simultaneously, can be fused into a single module, and so forth.

In operation, the merged image creation module 210 combines portions (e.g., a slice or a fill for a hole) from different frames 130 into a merged image 126. As illustrated, the source frame 130-S includes a first source portion 1002-1 and a second source portion 1002-2. The target frame 130-T includes a first target portion 1004-1 and a second target portion 1004-2. To create the merged image 126, the merged image creation module 210 combines a warped version of the first source portion 1002-1 with the second target portion 1004-2. In other words, meshes warped from the first source portion 1002-1 of the source frame 130-S are used to replace corresponding meshes in the first target portion 1004-1 of the target frame 130-T.

The frame-level and pixel-level image registration as described herein can be used in a number of different image manipulation tasks. Example image manipulation tasks of videos include: video in□painting, completion, or hole□filling; video perspective correction or rectification; video beautification; video segmentation; time slice videography; video stabilization; video stitching; and combinations thereof. Other examples include: video compositing, as illustrated in FIG. 10; 3D compositing wherein seams between objects in 2D images are selected to reflect the underlying 3D boundaries; 3D-aware copying and pasting between videos such that pixel cuts can have the same 3D depth; virtual reality (VR) image stitching, including 360° VR stitching; and combinations thereof. Still further examples include: reconstructing a high-dynamic-range (HDR) video from multiple shots of a scene in multiple passes with different camera settings, fusing multiple videos for denoising, fusing multiple videos for super-resolution, and combinations thereof.

Figures 1, 11:
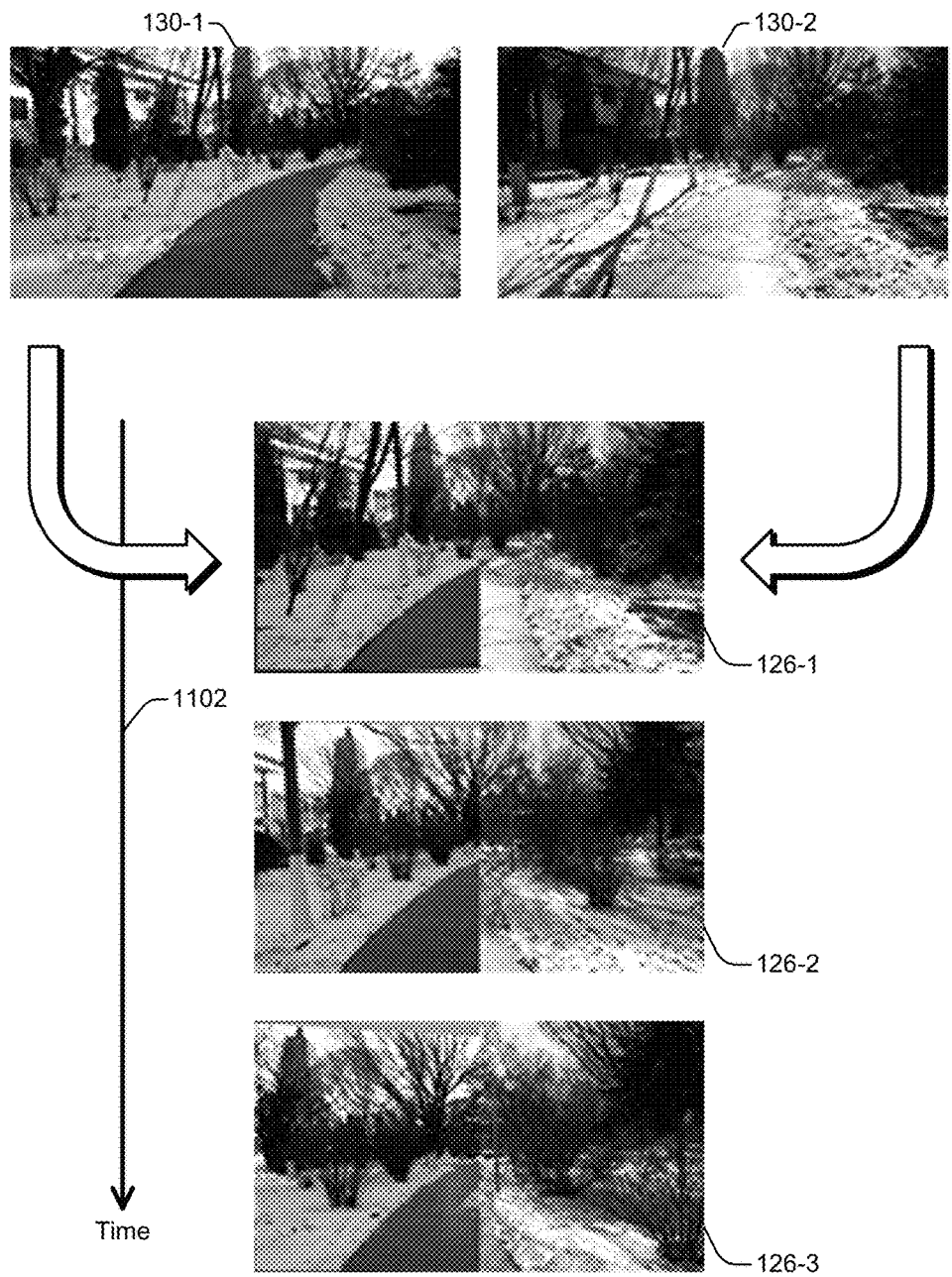
Figures 2, 11:
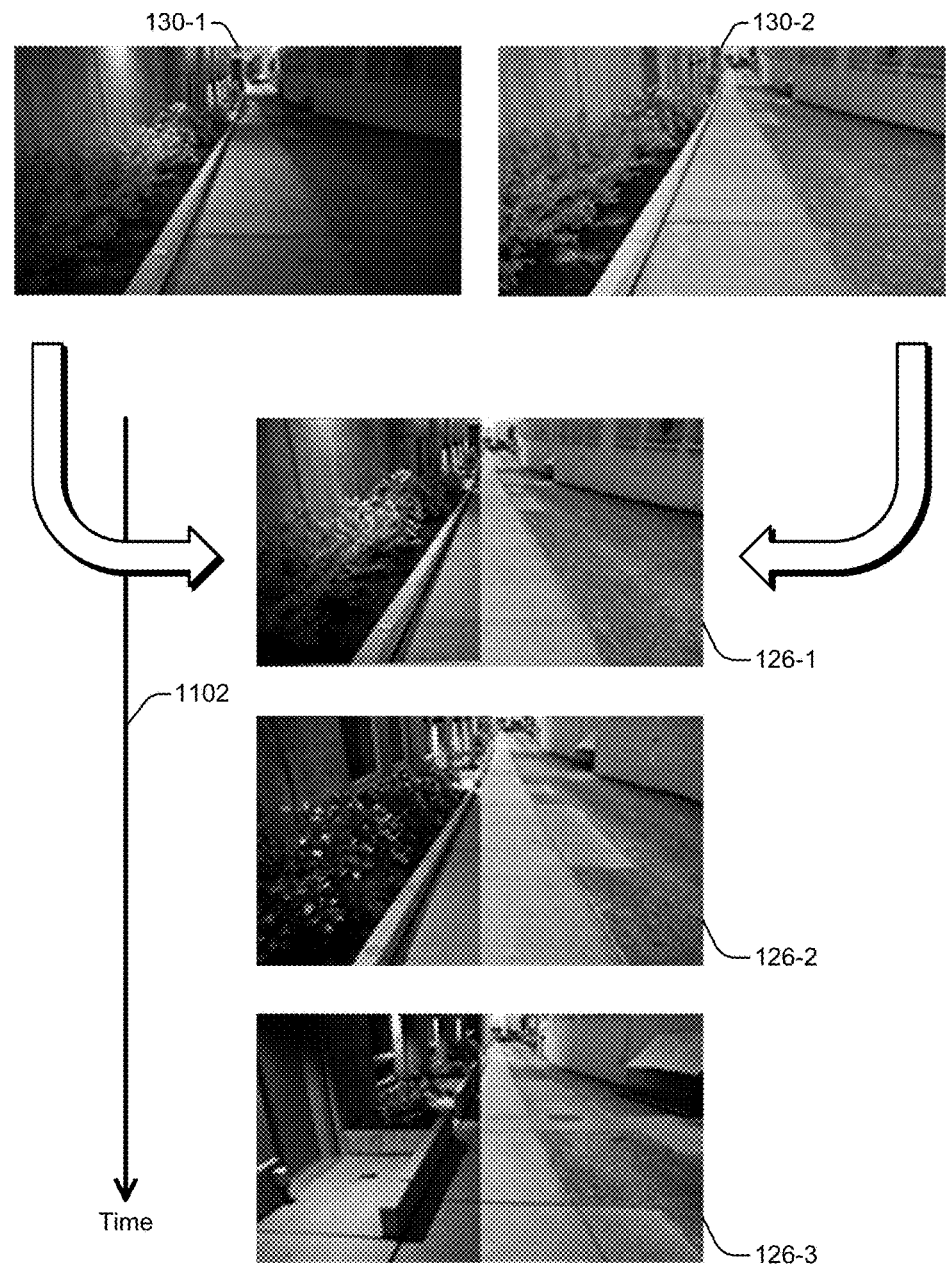

FIGS. 11-1 and 11-2 illustrate example results 1100-1 and 1100-2, respectively, for multi-video registration for video synthesis in an example time slice video manipulation task. At the top of each of FIGS. 11-1 and 11-2, a first frame 130-1 and a second frame 130-2 of two different videos are shown to illustrate an example of the illumination differences between the two different videos. One frame 130 is warped toward the other frame 130. In FIG. 11-1, the scene is a paved walkway extending along the trajectory of the cameras between houses on the left and a wooded area on the right. In FIG. 11-2, the scene is a sidewalk along an alleyway extending along the trajectory of the cameras between a line of apartments on the left and a long commercial building on the right.

The visual results after a create merged images phase 310 are shown with regard to a time axis 1102. As indicated, time increases in the downward direction. The results 1100-1 in FIG. 11-1 include three merged images 126-1, 126-2, and 126-3. Although the illumination differs on the left as compared to the right, the paved walkway and trees substantially line up. The results 1100-2 in FIG. 11-2 also include three merged images 126-1, 126-2, and 126-3. Although the illumination differs on the left as compared to the right, the sidewalk edges and the perpendicular lines across the sidewalk line up, even as the region on the left changes types of flora in a flowerbed and then reaches a door having a paved entryway.

Having discussed example details of systems, techniques, and schemes for multi-video registration for video synthesis, some example procedures to illustrate additional aspects of the techniques are described below.

Example Procedures

Figure 12:
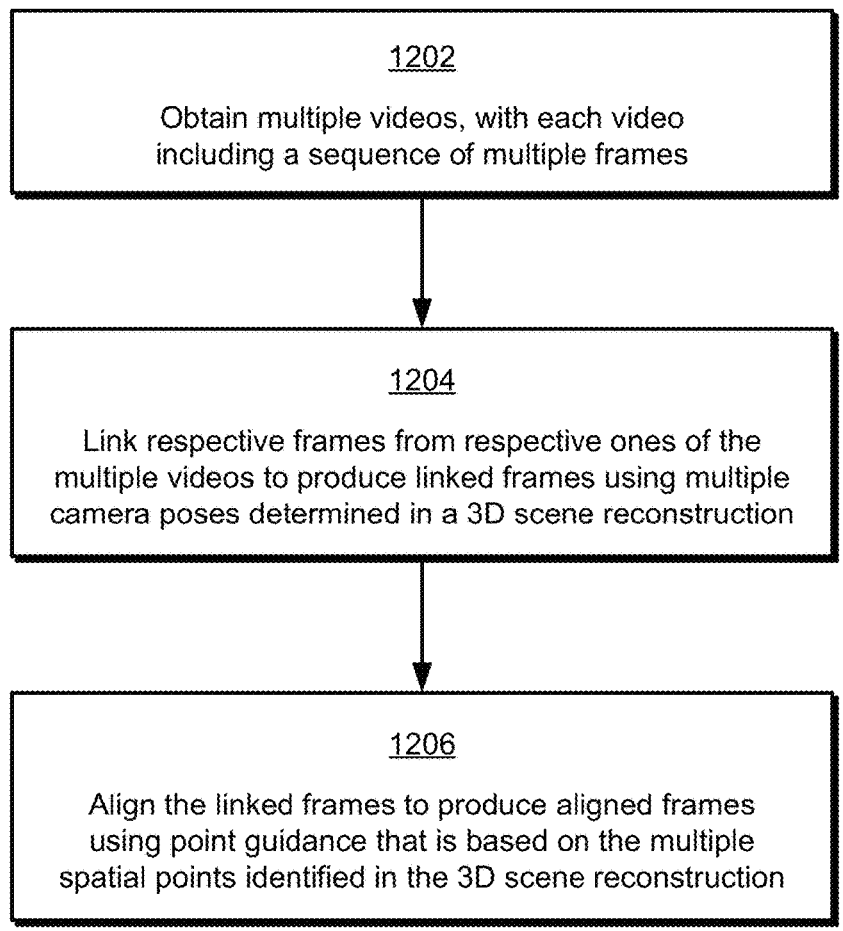
FIG. 12 is a flow diagram illustrating an example procedure in accordance with one or more example implementations.
Figure 13:
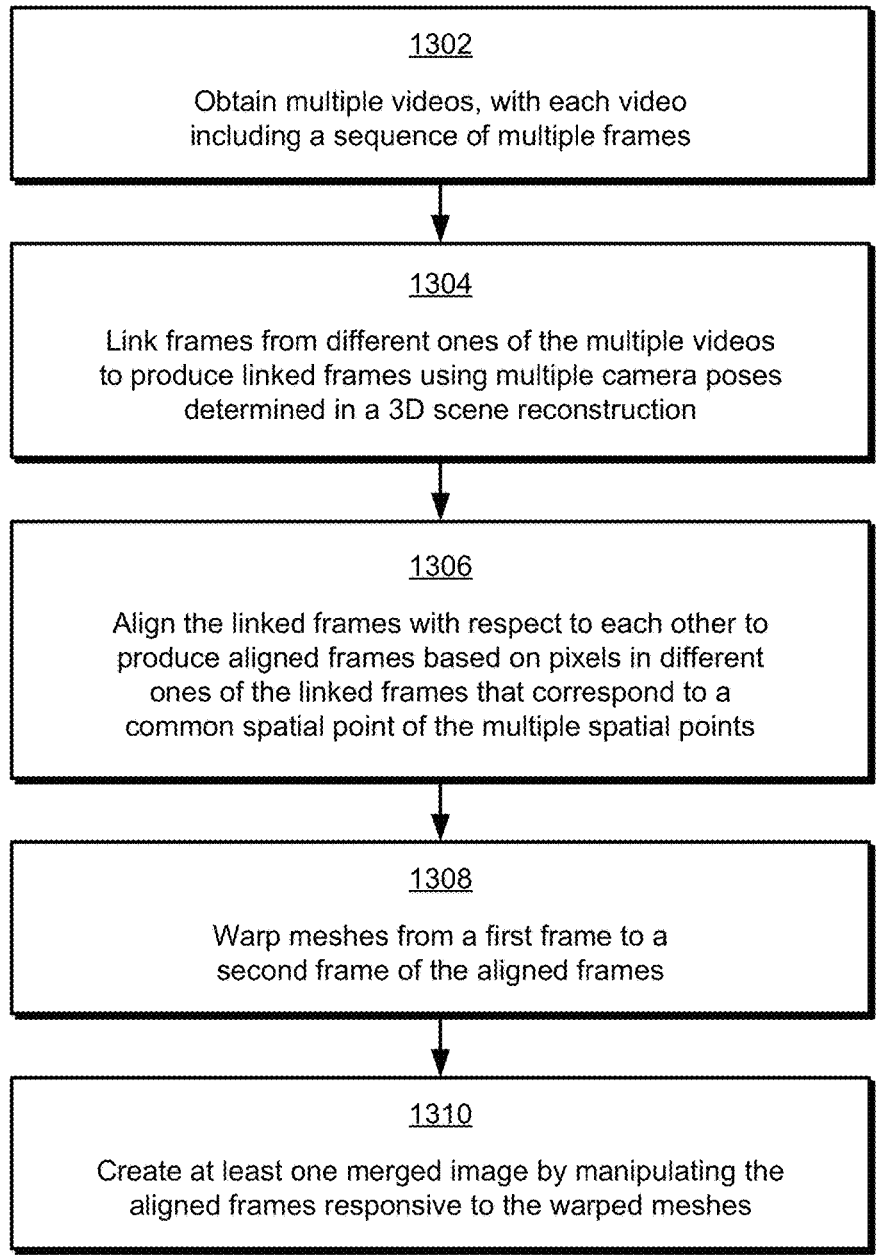
FIG. 13 is another flow diagram illustrating another example procedure in accordance with one or more example implementations.

This section describes with reference to FIGS. 12 and 13 example procedures relating to multi-video registration for video synthesis in one or more implementations. Aspects of the procedures may be implemented in hardware, firmware, or software, or a combination thereof. The procedures are shown as sets of blocks specifying operations that may be performed by one or more devices, but performance of the operations is not necessarily limited to the orders as shown by the respective blocks or as described herein, for the operations may be performed in other orders or in fully or partially overlapping manners. In at least some implementations, the procedures may be performed by a suitably configured device, such as an example computing device 102 (of FIG. 1) or 1402 (of FIG. 14) using a video synthesis module 124 (e.g., of FIGS. 1-3 and 14). Items illustrated in other figures are referred to throughout the description of these procedures.

FIG. 12 is a flow diagram that includes three blocks 1202-1206 and that illustrates an example procedure 1200 for multi-video registration for video synthesis in accordance with one or more example embodiments. At block 1202, multiple videos are obtained, with each video including a sequence of multiple frames. For example, at least one computing device can obtain multiple videos 128, with each video 128 including a sequence 132 of multiple frames 130. For instance, a video obtainment module 202 may retrieve two videos 128 from memory.

At block 1204, respective frames from respective ones of the multiple videos are linked to produce linked frames using multiple camera poses determined in a 3D scene reconstruction. For example, the computing device can link respective frames 130 from respective ones of the multiple videos 128 to produce linked frames 130 using multiple camera poses 320 determined in a 3D scene reconstruction 312. To do so, a video frame linking module 204 may generate the 3D scene reconstruction 312 using the two videos 128 and then link respective first and second frames 130-1 and 130-2 based on estimated camera poses 320 of the 3D scene reconstruction 312 or relative elapsed times of the frames 130.

At block 1206, the linked frames are aligned to produce aligned frames using point guidance that is based on the multiple spatial points identified in the 3D scene reconstruction. For example, the computing device can align the linked frames 130 to produce aligned frames 130 using point guidance that is based on the multiple spatial points 314 identified in the 3D scene reconstruction 312. A linked frame alignment module 206 may, for instance, align two linked frames 130-1 and 130-2 based on pixels 316 in both linked frames that correspond to a common spatial point of the 3D scene reconstruction 312. The aligned frames 130 can then be used to synthesize the multiple videos 128 to create at least one merged image 126. To create the merged image 126, a merged image creation module 210 may combine warped portions from the first frame 130-1 with portions of the second frame 130-2.

FIG. 13 is a flow diagram that includes five blocks 1302-1310 and that illustrates an example procedure 1300 for multi-video registration for video synthesis in accordance with one or more example embodiments. At block 1302, multiple videos are obtained, with each video including a sequence of multiple frames. For example, at least one computing device can obtain multiple videos 128, with each video 128 including a sequence 132 of multiple frames 130. For instance, a video synthesis module 124 may communicate with a camera application to obtain two videos 128.

At block 1304, frames from different ones of the multiple videos are linked to produce linked frames using multiple camera poses determined in a 3D scene reconstruction. For example, the computing device can link frames 130 from different ones of the multiple videos 128 to produce linked frames 130 using multiple camera poses 320 determined in a 3D scene reconstruction 312. To do so, the video synthesis module 124 may receive the 3D scene reconstruction 312 from another application or an external computing device.

The video synthesis module 124 may link frames 130 that have a similar estimated camera position or camera orientation (e.g., location and view) of a 3D scene as a camera tracks through two different trajectories over a path for the two videos 128.

At block 1306, the linked frames are aligned with respect to each other to produce aligned frames based on pixels in different ones of the linked frames that correspond to a common spatial point of the multiple spatial points. For example, the computing device can align the linked frames 130 with respect to each other to produce aligned frames 130 based on pixels 316 in different ones of the linked frames 130 that correspond to a common spatial point 314 of the multiple spatial points 314. The video synthesis module 124 may compute flow vectors for pixels 316 between linked frames 130 based on a factor that reflects if, or where, particular pixels 316P both correspond to a same particular spatial point 314P.

At block 1308, meshes are warped from a first frame to a second frame of the aligned frames. For example, the computing device can warp 902 meshes 318 from a first frame 130-1 to a second frame 130-2 of the aligned frames 130. In addition to using computed flow vectors, the video synthesis module 124 may determine warpings 902 based on a number of factors, including a temporal similarity factor that constrains warpings 902 of corresponding meshes 318 of consecutive frames 130 to be similar.

At block 1310, at least one merged image is created by manipulating the aligned frames responsive to the warping of the meshes. For example, the computing device can create at least one merged image 126 by manipulating the aligned frames 130 responsive to the warping 902 of the meshes 318. To create the merged image 126, the video synthesis module 124 may replace a portion of the second frame 130-2 with warped meshes 318 from the first frame 130-1.

Having described example procedures in accordance with one or more implementations, an example system and devices are presented below that can be utilized to implement the various schemes and techniques described herein.

Example System and Device

Figure 14:
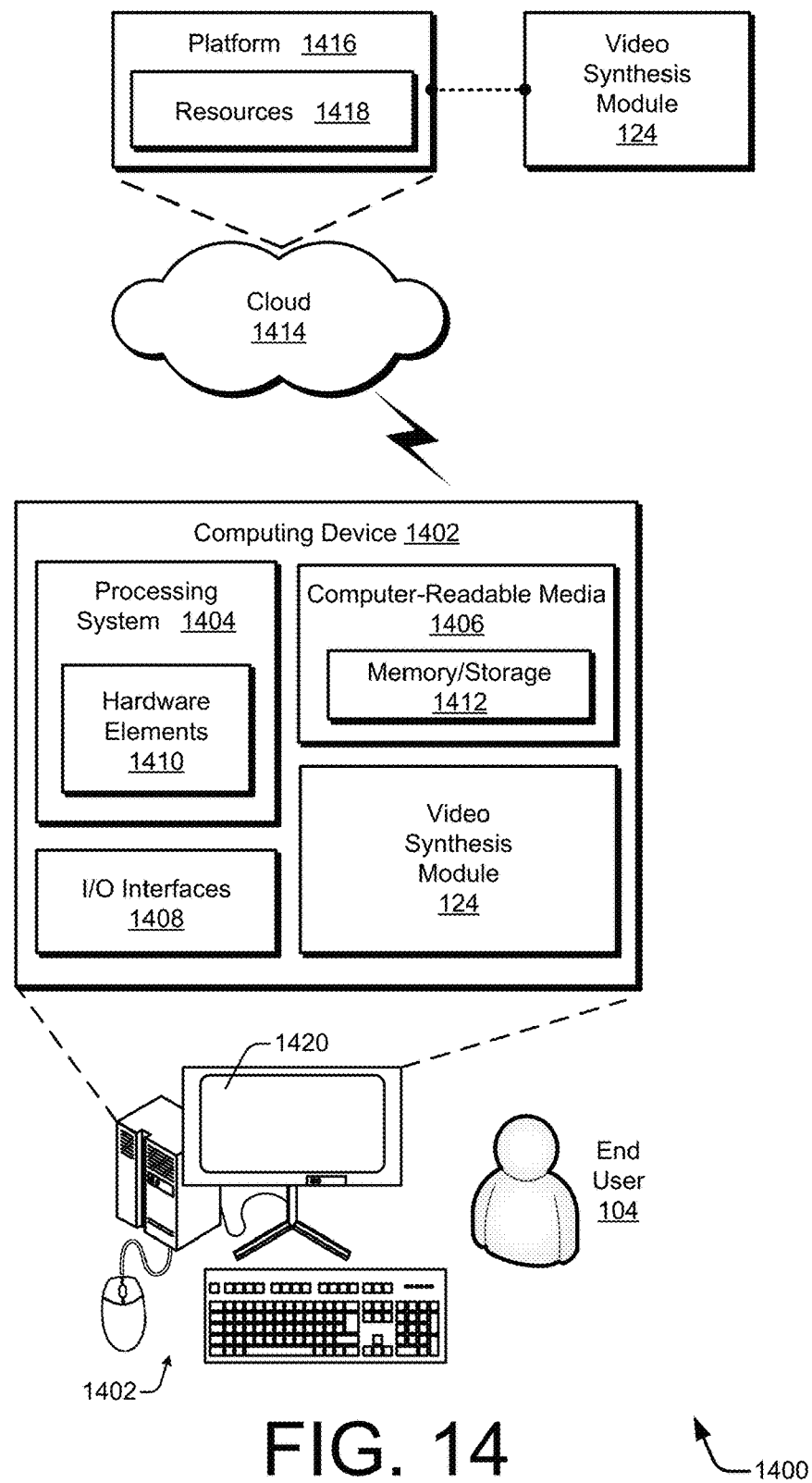
FIG. 14 illustrates an example system including various components of example devices that can be employed for one or more implementations of multi-video registration for video synthesis.

FIG. 14 illustrates generally at 1400 an example system including an example computing device 1402 representative of one or more computing systems or computing devices that may implement the various techniques described herein. This is depicted through the inclusion of a video synthesis module 124, which may operate as described herein above. As shown, computing device 1402 may be implemented as, for example, a computing device 102 (of FIG. 1) in an independent or standalone mode. The computing device 1402 can display videos or a merged image to the end user 104 via a display screen 1420. Generally, a computing device 1402 may be implemented as, for example, an end user device (e.g., a smart phone or desktop computer) of an end user 104, a corporate device of a business (e.g., a server side device or data center hardware), an on-chip system or system-on-a-chip (SOC) (e.g., that is integrated with a tablet device or a display device), or any other suitable computing device or computing system.

In an example implementation as shown in FIG. 1, the video synthesis module 124 is executing at one location (e.g., within a housing of the computing device 102). However, the video synthesis module 124 can alternatively be executing in the cloud (e.g., on a network-side computing device) if bandwidth is sufficiently large or transmission latency is sufficiently small, and such an example implementation is also shown in FIG. 14. Alternatively, a portion of the video synthesis module 124 can be executing at both a client-side computing device and a server-side computing device. In such an implementation, the operations implemented by the video synthesis module 124 as described herein may be distributed across a client-server architecture.

The example computing device 1402 as illustrated includes at least one processing system 1404, one or more computer-readable media 1406, and one or more I/O interfaces 1408 that may be communicatively coupled, one to another. Although not explicitly shown, the computing device 1402 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including one or more hardware elements 1410 that may be implemented as processors, functional blocks, and so forth. This may include implementation in hardware as an application specific integrated circuit (ASIC), a general-purpose processor, or other logic device formed using e.g. one or more semiconductors. The hardware elements 1410 are not limited by the materials from which they are formed or the processing mechanisms employed therein. For example, processors may include or may be realized with semiconductor(s) or transistors (e.g., electronic integrated circuits (ICs)). In such a context, processor-executable instructions may comprise electronically-executable instructions.

The computer-readable storage media 1406 is illustrated as including a memory/storage component 1412. The memory/storage component 1412 represents memory/storage capacity associated with one or more computer-readable media. The memory/storage component 1412 may include volatile media (e.g., random access memory (RAM)) or nonvolatile media (e.g., read only memory (ROM), flash memory, optical discs, or magnetic disks). The memory/ storage component 1412 may include fixed media (e.g., RAM, ROM, or a fixed hard drive) or removable media (e.g., a flash memory card, a removable hard drive, or an optical disc). The computer-readable media 1406 may be implemented in a variety of other ways as further described below.

The input/output interface(s) 1408 are representative of functionality to allow a user to enter commands or information to computing device 1402 or to allow information to be presented to the user, or other components or devices using various input/output devices. Examples of input devices include a keyboard, a cursor control device (e.g., a mouse or touchpad), a microphone, a scanner, touch functionality (e.g., capacitive, resistive, or other sensors implemented to detect physical touch), a camera (e.g., which may employ visible or non-visible wavelengths such as infrared frequencies to recognize movement as gestures that need not involve touch), an accelerometer, or a combination thereof. Examples of output devices include a display device (e.g., a liquid crystal display (LCD) screen, a light-emitting diode (LED) display screen, a monitor, or a projector), a speaker, a printer, a network card, a haptic vibrating device, or a combination thereof. Thus, the computing device 1402 may be implemented in a variety of ways as further described below to support local or remote user interaction.

Various techniques may be described herein in the general context of software, hardware elements, or program modules. Generally, such modules may include routines, programs, objects, elements, components, data structures, combinations thereof, and so forth that perform particular tasks or implement particular abstract data types. The terms "module," "functionality," and "component" as used herein generally represent software, firmware, hardware, fixed logic circuitry, or a combination thereof. The features of the techniques described herein may be platform-independent, meaning that the described techniques may be implemented on a variety of commercial computing platforms having a variety of processors.

An implementation of the described modules, and techniques thereof, may be stored on or transmitted across some form of computer-readable media. The computer-readable media 1406 may include a variety of media that may be accessed by the computing device 1402. By way of example, and not limitation, computer-readable media may include "computer-readable storage media" and "computer-readable signal media."

"Computer-readable storage media," as used herein, refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, as well as removable and non-removable, media or storage devices implemented in a process or technology suitable for storage of information, such as computer-readable instructions, data structures, program modules, logic elements/circuits, or other data. Examples of computer-readable storage media include RAM, ROM, EEPROM, flash memory, or other e.g. solid state memory technology; CD-ROM, digital versatile discs (DVD), or other optical storage; hard disks, magnetic cassettes, magnetic tape, magnetic disk storage, or other magnetic storage devices; or another storage device, tangible medium, article of manufacture, or combination thereof that is suitable to store desired information and that may be accessed by a computer.

"Computer-readable signal media," as used herein, refers to a signal-bearing medium implemented to transmit instructions to hardware of the computing device 1402, such as via a network. Computer-readable signal media may typically embody computer-readable instructions, data structures, program modules, or other data in a modulated data signal, such as carrier waves, data signals, or another transport mechanism. Computer-readable signal media may also include any information delivery media. The term "modulated data signal" means a signal having one or more of its characteristics set or changed in such a manner as to encode information in the signal. By way of example, computer-readable signal media include wired media, such as a wired network or direct wired connection, or wireless media, such as acoustic, RF, microwave, infrared, or other wireless media.

As previously described, hardware elements 1410 or computer-readable media 1406 may be representative of modules, programmable device logic, fixed device logic, a combination thereof, and so forth that are implemented in a hardware form that may be employed in some implementations to realize at least some aspects of the techniques described herein, such as to perform one or more instructions or computing actions. Hardware may include components of an integrated circuit (IC) or on-chip system, an ASIC, a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media or by one or more hardware elements 1410. The computing device 1402 may be configured to implement particular instructions or functions corresponding to software or hardware modules. Accordingly, implementation of a module that is executable by the computing device 1402 as software may be achieved at least partially in hardware, e.g., through use of computer-readable storage media or the hardware elements 1410 of the processing system 1404. The instructions or functions may be executable/operable by one or more articles of manufacture (e.g., one or more computing devices 1402 or processing systems 1404) to implement techniques, modules, or examples described herein.

The techniques described herein may be supported by various configurations of the computing device 1402 and are not limited to the specific aspects of the example devices described herein. This functionality may also be implemented fully or partially through use of a distributed system, such as over a "cloud" 1414 via a platform 1416 as described below.

The cloud 1414 may include or represent a platform 1416 for resources 1418. The platform 1416 abstracts underlying functionality of hardware (e.g., one or more servers or at least one data center) and software resources of the cloud 1414. The resources 1418 may include applications or data that can be utilized while computer processing is at least partially executed on servers remote from, or distributed around, the computing device 1402. Resources 1418 may also include services provided over the internet or through a subscriber network, such as a cellular or Wi-Fi network.

The platform 1416 may abstract resources and functions to connect the computing device 1402 with other computing devices or services. The platform 1416 may also serve to abstract a scaling of resources to provide a corresponding level of scale to encountered demand for the resources 1418 implemented via the platform 1416. Accordingly, in an interconnected device embodiment, implementation of functionality described herein may be distributed throughout the illustrated system of FIG. 14, or at least throughout the cloud 1414 along with the computing device 1402. For example, functionality may be implemented in part on the computing device 1402 as well as via the platform 1416 that abstracts the functionality of the cloud 1414.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment in which multiple videos are synthesized to create at least one merged images using an automated mechanism to register the multiple videos, a method implemented by at least one computing device, the method comprising:
   obtaining, by the at least one computing device, the multiple videos, each video of the multiple videos including a sequence of multiple frames;
   linking, by the at least one computing device, respective frames from respective videos of the multiple videos to produce linked frames based on multiple camera poses determined from a three-dimensional scene reconstruction, the linking including checking a pixel matching using a consistency error based on at least one bi-directional flow between the respective frames to be linked;
   producing, by the at least one computing device, aligned frames using point guidance by aligning the linked frames based on spatial points identified in the three-dimensional scene reconstruction; and
   generating, by the at least one computing device, the at least one merged image based on the aligned frames from the multiple videos.

2. The method of claim 1, wherein the aligning the linked frames comprises aligning the linked frames at a pixel level using scale invariant feature transform (SIFT) descriptors that are matched along a flow vector.

3. The method of claim 1, wherein the aligning the linked frames comprises:
   projecting spatial points of the three-dimensional scene reconstruction onto each frame of the multiple frames of the multiple videos;
   computing scale invariant feature transform (SIFT) descriptors for the multiple frames; and
   determining pixel matching using the computed SIFT descriptors based on a data factor, a smoothness factor, and a point guidance factor, the point guidance factor incorporating into the pixel matching the spatial points projected onto the multiple frames.

4. The method of claim 1, further comprising warping meshes between aligned frames based on a temporal similarity factor that constrains corresponding meshes of temporally-proximate frames to be similar.

5. The method of claim 1, wherein the linking respective frames comprises registering frames from the multiple videos using a structure-from-motion (SfM) technique.

6. The method of claim 5, wherein the registering frames comprises generating the three-dimensional scene reconstruction and determining the multiple camera poses using two-dimensional images from the sequence of the multiple frames for each video of the multiple videos.

7. At least one computing device operative in a digital medium environment in which multiple videos are synthesized to create merged images using an automated mechanism to register the multiple videos, the at least one computing device including a processing system and at least one computer-readable storage medium, the at least one computing device comprising:
   a video obtainment module configured to obtain multiple videos, each respective video including a respective sequence of multiple frames;
   a video frame linking module configured to:
      link respective frames of respective ones of the multiple videos to produce linked frames using a three-dimensional scene reconstruction generated from the multiple videos; and
      check pixel matching using a consistency error based on at least one bi-directional flow between the respective frames to be linked;
   a linked frame alignment module configured to align the linked frames with flow vectors computed using point guidance to produce aligned frames, the point guidance based on spatial points included in the three-dimensional scene reconstruction that project onto corresponding pixels in the linked frames, the aligned frames including source frames that are respectively aligned with target frames;
   an inter-frame mesh warping module configured to warp meshes from a source frame to a target frame based on the flow vectors; and
   a merged image creation module configured to create at least one merged image using the target frame and the meshes as warped from the source frame.

8. The at least one computing device of claim 7, wherein the video frame linking module is configured to generate the three-dimensional scene reconstruction using a global structure-from-motion (SfM) technique that determines camera poses.

9. The at least one computing device of claim 7, wherein the linked frame alignment module is configured to:
   project the spatial points onto the source frame and the target frame to identify pixels that correspond between the source frame and the target frame at a common spatial point of the three-dimensional scene reconstruction;
   compute a global homography transformation between the source frame and the target frame using the identified pixels that correspond between the source frame and the target frame; and
   pre-warp the source frame toward the target frame based on the global homography transformation.

10. The at least one computing device of claim 7, wherein the linked frame alignment module is configured to:
   project the spatial points onto the source frame and the target frame to identify pixels that correspond between the source frame and the target frame at a common spatial point of the three-dimensional scene reconstruction; and
   compute the flow vectors based on a point guidance factor that constrains pixels of the source frame and the target frame having a common corresponding spatial point to be matched.

11. The at least one computing device of claim 10, wherein the linked frame alignment module is further configured to:
   compute the flow vectors such that a particular pixel of the source frame that corresponds to a particular spatial point of the three-dimensional scene reconstruction is matched to a particular pixel of the target frame that corresponds to the particular spatial point.

12. The at least one computing device of claim 10, wherein the linked frame alignment module is further configured to:
   compute the flow vectors based on a data factor and a smoothness factor, the data factor constraining a difference between scale invariant feature transform (SIFT) descriptors being matched along the flow vectors, and the smoothness factor constraining flow vectors of proximate pixels to be similar.

13. The at least one computing device of claim 7, wherein the linked frame alignment module is configured to check the pixel matching:

compute the consistency error as a bi-directional consistency error based on a source pixel of the source frame and a target pixel of the target frame, a correspondence existing between the source pixel and the target pixel; and conditionally remove the correspondence between the source pixel and the target pixel based on the bi-directional consistency error.

14. The at least one computing device of claim 7, wherein the inter-frame mesh warping module is configured to warp the meshes from the source frame to the target frame based on a temporal similarity factor that constrains mesh warpings to be similar to those of temporally-proximate frames.

15. The at least one computing device of claim 7, wherein the merged image creation module is configured to combine one or more portions of the source frame as warped by the inter-frame mesh warping module with one or more portions of the target frame to create the at least one merged image.

16. In a digital medium environment in which multiple videos are synthesized to create merged images using an automated mechanism to register the multiple videos, a method implemented by at least one computing device, the method comprising:

obtaining, by the at least one computing device, multiple videos, each video including a sequence of multiple frames;

obtaining a three-dimensional scene reconstruction including multiple coordinate spatial points that correspond to respective pixels included in respective frames of the multiple videos and multiple camera poses;

generating, by the at least one computing device, a frame-level registration by registering the sequences of the multiple frames at a frame level in three-dimensional space based on the three-dimensional scene reconstruction and associated said multiple camera poses;

generating, by the at least one computing device, a pixel-level registration based at least in part on the frame-level registration;

checking, by the at least one computing device, consistency of the pixel-level registration;

linking, by the at least one computing device, frames from different ones of the multiple videos to produce linked frames based on the multiple camera poses;

aligning, by the at least one computing device, the linked frames with respect to each other to produce aligned frames based on the pixel-level registration;

warping, by the at least one computing device, meshes from a first frame to a second frame of the aligned frames; and generating, by the at least one computing device, at least one merged image from the first frame and the second frame of the aligned frames responsive to the warping of the meshes.

17. The method as described in claim 16, wherein the obtaining the three-dimensional scene reconstruction includes extracting key frames and obtaining sparse three-dimensional points from the key frames as the three-dimensional scene reconstruction using a global scale invariant feature transform (SIFT) system.

18. The method as described in claim 17, wherein the generating of the pixel-level registration uses a guided scale invariant feature transform (SIFT) system.

19. The method as described in claim 16, wherein the checking of the consistency includes checking pixel matching using a consistency error based on at least one bi-directional flow.

20. The method as described in claim 16, wherein the generating of the frame-level registration comprises generating the three-dimensional scene reconstruction and determining the multiple camera poses using two-dimensional images from the sequence of the multiple frames for each video of the multiple videos.

* * * * *